(12) United States Patent
Jiang et al.

(10) Patent No.: US 10,116,385 B2
(45) Date of Patent: Oct. 30, 2018

(54) SYSTEM AND METHOD FOR PILOT DATA DETECTION USING CORRELATION PEAK TRACKING

(71) Applicant: Huawei Technologies Co., Ltd., Shenzhen (CN)

(72) Inventors: Zhiping Jiang, Kanata (CA); Jianhong Ke, Stittsville (CA); Dajiang Jin, Sichuan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 77 days.

(21) Appl. No.: 15/336,130

(22) Filed: Oct. 27, 2016

(65) Prior Publication Data

US 2018/0102840 A1    Apr. 12, 2018

Related U.S. Application Data

(63) Continuation of application No. PCT/CN2016/101499, filed on Oct. 8, 2016.

(51) Int. Cl.
*H04B 10/077* (2013.01)
*H04B 10/079* (2013.01)
*H04L 5/00* (2006.01)
*H04J 14/02* (2006.01)

(52) U.S. Cl.
CPC ... *H04B 10/07953* (2013.01); *H04B 10/0775* (2013.01); *H04J 14/02* (2013.01); *H04L 5/0048* (2013.01)

(58) Field of Classification Search
None
See application file for complete search history.

(56) References Cited

U.S. PATENT DOCUMENTS

| 5,825,515 | A  | * | 10/1998 | Anderson | H04B 10/035 |
|---|---|---|---|---|---|
|  |  |  |  |  | 398/10 |
| 5,966,402 | A  |  | 10/1999 | Yamamoto |  |
| 6,404,525 | B1 | * | 6/2002 | Shimomura | H04B 10/03 |
|  |  |  |  |  | 398/82 |
| 8,891,671 | B2 | * | 11/2014 | Li | H01Q 3/267 |
|  |  |  |  |  | 375/295 |
| 2003/0043437 | A1 | * | 3/2003 | Stough | H04B 10/07 |
|  |  |  |  |  | 398/141 |
| 2003/0142764 | A1 | * | 7/2003 | Keevill | H04L 27/265 |
|  |  |  |  |  | 375/341 |

(Continued)

*Primary Examiner* — Li Liu
(74) *Attorney, Agent, or Firm* — Slater Matsil, LLP

(57) ABSTRACT

During optical performance monitoring in low SNR conditions, the detection of pilot data may be more difficult because the detector may mistake noise for the pilot data signal. Systems and methods are disclosed herein that try to address this problem. In one embodiment, a pilot tone detector processes the received signal to determine a maximum correlation peak, and then performs tracking of the correlation peak over time. Unlike the pilot data signal, noise is typically more transient in nature. Therefore, if a correlation peak does not actually correspond to the pilot data signal, but instead corresponds to noise, then the correlation peak typically disappears over time when tracked. A search for a new correlation peak may then be performed. When a correlation peak is determined that actually corresponds to the pilot data signal, then the correlation peak typically remains when tracked.

22 Claims, 19 Drawing Sheets

(56) References Cited

U.S. PATENT DOCUMENTS

| | | | |
|---|---|---|---|
| 2005/0019040 A1* | 1/2005 | Trutna, Jr. | H04B 10/5053 398/183 |
| 2006/0079290 A1* | 4/2006 | Seto | H01Q 3/2605 455/562.1 |
| 2007/0025739 A1* | 2/2007 | Moore | H04B 10/40 398/202 |
| 2007/0057718 A1* | 3/2007 | Coulson | H04B 1/76 327/551 |
| 2008/0187324 A1* | 8/2008 | Akiyama | H04B 10/50 398/188 |
| 2010/0172448 A1* | 7/2010 | Suberviola | G01S 19/29 375/343 |
| 2014/0341568 A1* | 11/2014 | Zhang | H04J 14/0212 398/34 |
| 2015/0304052 A1* | 10/2015 | Schemmann | H04B 10/572 398/68 |
| 2015/0319028 A1* | 11/2015 | Razmtouz | H04J 13/0059 398/67 |

* cited by examiner

SYSTEM AND METHOD FOR PILOT DATA DETECTION USING CORRELATION PEAK TRACKING

CROSS-REFERENCE TO RELATED APPLICATIONS

This application is a Continuation of PCT Application No. PCT/CN2016/101499, filed on Oct. 8, 2016, which application is hereby incorporated herein by reference.

TECHNICAL FIELD

The following relates to detecting pilot data that is carried by a pilot tone and that is used for optical performance monitoring.

BACKGROUND

In an optical communication system, wavelength division multiplexing (WDM) may be used to multiplex a plurality of optical channels onto a single optical fiber. Each optical channel carries respective data at a different optical wavelength. Dense wavelength division multiplexing (DWDM) is one type of WDM that may be employed.

In a WDM system, it may be desirable to monitor the performance of the optical channels through optical performance monitoring. One way to perform optical performance monitoring is to use a respective pilot tone carried on each optical channel. A pilot tone is a small and relatively low-frequency modulation (e.g. kHz to MHz) applied to each optical channel. Each optical channel is modulated with a different pilot tone frequency. Each pilot tone may carry respective pilot data. The pilot data of each optical channel may be detected in various places of interest in the optical network and used to perform the optical performance monitoring. Also, the power of a particular pilot tone may be useful for estimating the power of the optical channel.

Reliable pilot data detection is desirable in both high signal-to-noise (SNR) conditions and low SNR conditions.

SUMMARY

In low SNR conditions, detection of pilot data may be more difficult because the detector may mistake noise for the pilot data signal. Systems and methods are disclosed herein that try to address this problem. In one embodiment, a pilot tone detector processes the received signal to determine a maximum correlation peak, and then performs tracking of the correlation peak over time. Unlike the pilot data signal, noise is typically more transient in nature. Therefore, if a correlation peak does not actually correspond to the pilot data signal, but instead corresponds to noise, then the correlation peak typically disappears over time when tracked. A search for a new maximum correlation peak may then be performed. When a maximum correlation peak is determined that actually corresponds to the pilot data signal, then the correlation peak typically remains when tracked.

In one embodiment, a method of detecting pilot data is provided. A pilot signal carrying the pilot data is received, and the method may include performing the following operations on the pilot signal. For a bit of the pilot data, correlation operations on the pilot signal are performed over a first set of frequency values and at a plurality of phases to produce a first set of correlation values. An initial maximum correlation peak is then obtained from the first set of correlation values. For each bit of subsequent bits of the pilot data, correlation operations on the pilot signal are then performed over a second set of frequency values and at a plurality of phases to produce a second set of correlation values. A subsequent maximum correlation peak is obtained from the second set of correlation values. However, the subsequent maximum correlation peak is only selected from correlation values, in the second set of correlation values, that were produced for phases, within a window around and encompassing a phase of the initial maximum correlation peak.

A pilot tone detector for performing methods disclosed herein is also disclosed.

BRIEF DESCRIPTION OF THE DRAWINGS

Embodiments will be described, by way of example only, with reference to the accompanying figures wherein.

DETAILED DESCRIPTION OF ILLUSTRATIVE EMBODIMENTS

For illustrative purposes, specific example embodiments will now be explained in greater detail below in conjunction with the figures.

Figure 1:
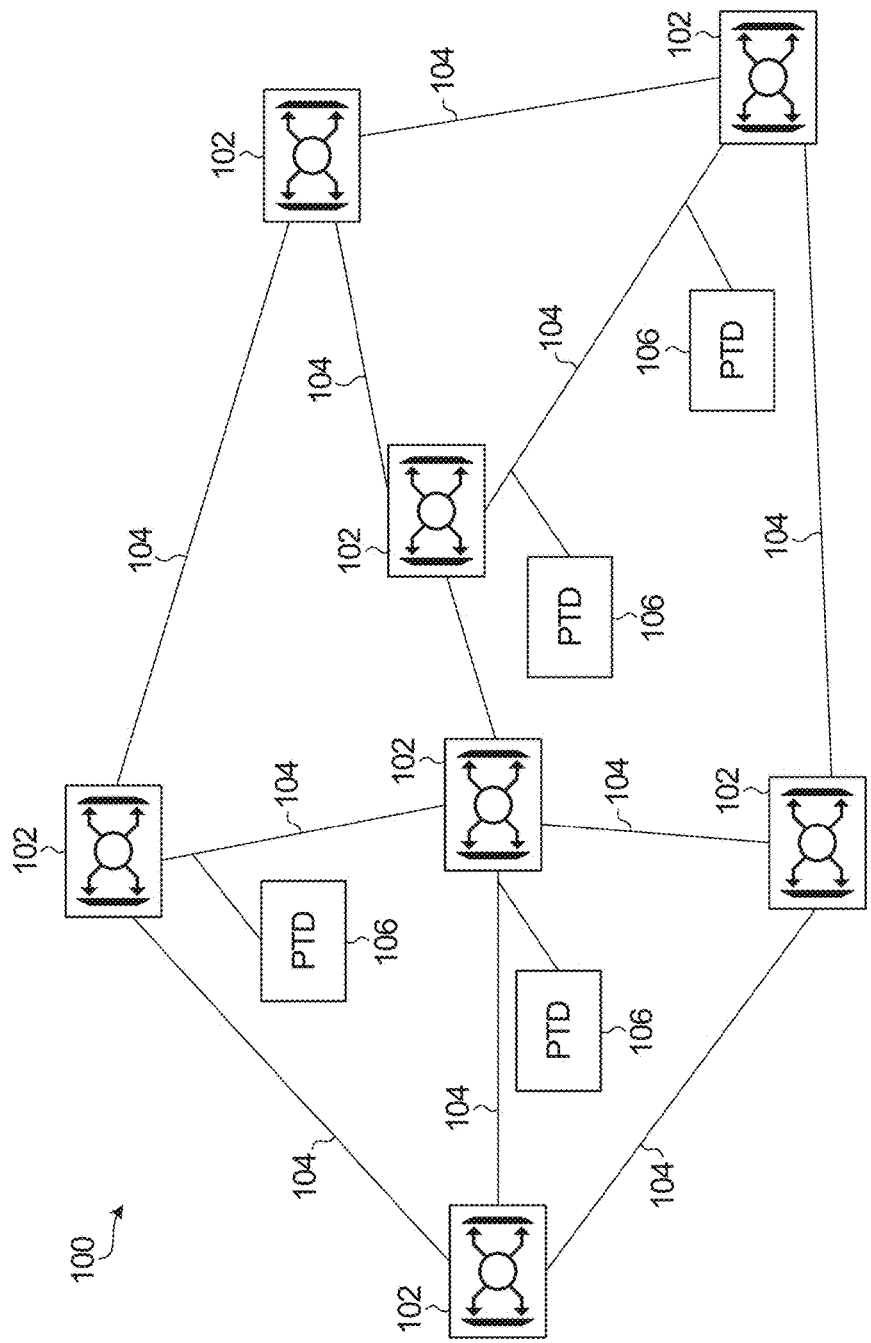
FIG. 1 is a block diagram of an optical network, according to one embodiment.

FIG. 1 is a block diagram of an optical network 100, according to one embodiment. The optical network 100 includes a plurality of reconfigurable optical add-drop multiplexers (ROADMs) 102 connected by optical links 104. A plurality of pilot tone detectors (PTDs) 106 are inserted at various places throughout the optical network 100. The optical network 100 may include additional components, but these have been omitted for the sake of clarity. In operation, each ROADM 102 is configured to add and drop optical channels, as well as switch optical channels between the different optical links 104. The PTDs 106 perform optical performance monitoring. The optical performance monitoring may include monitoring optical channel information on all optical channels, such as wavelength, power, modulation format, and baud rate. Usually only a small portion of the light is tapped and detected by the PTDs 106. The PTDs 106 may provide a lower cost and more efficient solution for managing optical WDM systems.

Figure 2:
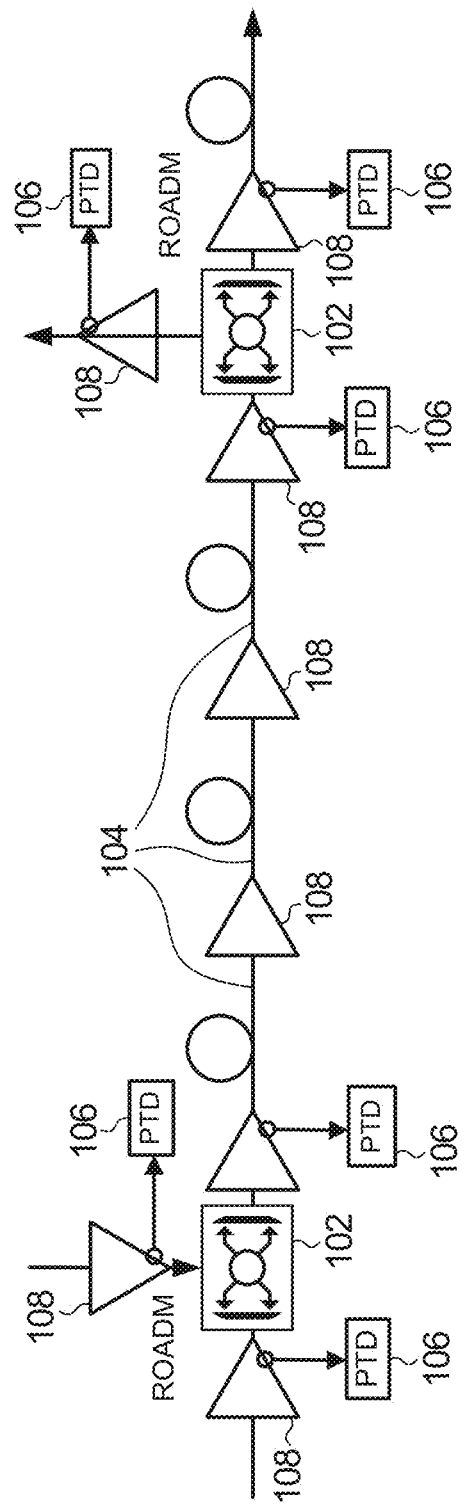
FIG. 2 is a block diagram illustrating a link between two reconfigurable optical add-drop multiplexers.

FIG. 2 is a block diagram illustrating a link between two of the ROADMs 102. The link includes a plurality of optical amplifiers 108 for amplifying the optical signal. Several of the PTDs 106 are illustrated, each of which for detecting pilot data on optical channels. In this example, the PTDs 106 are each placed at the output monitor port of an optical amplifier 108.

Figure 3:
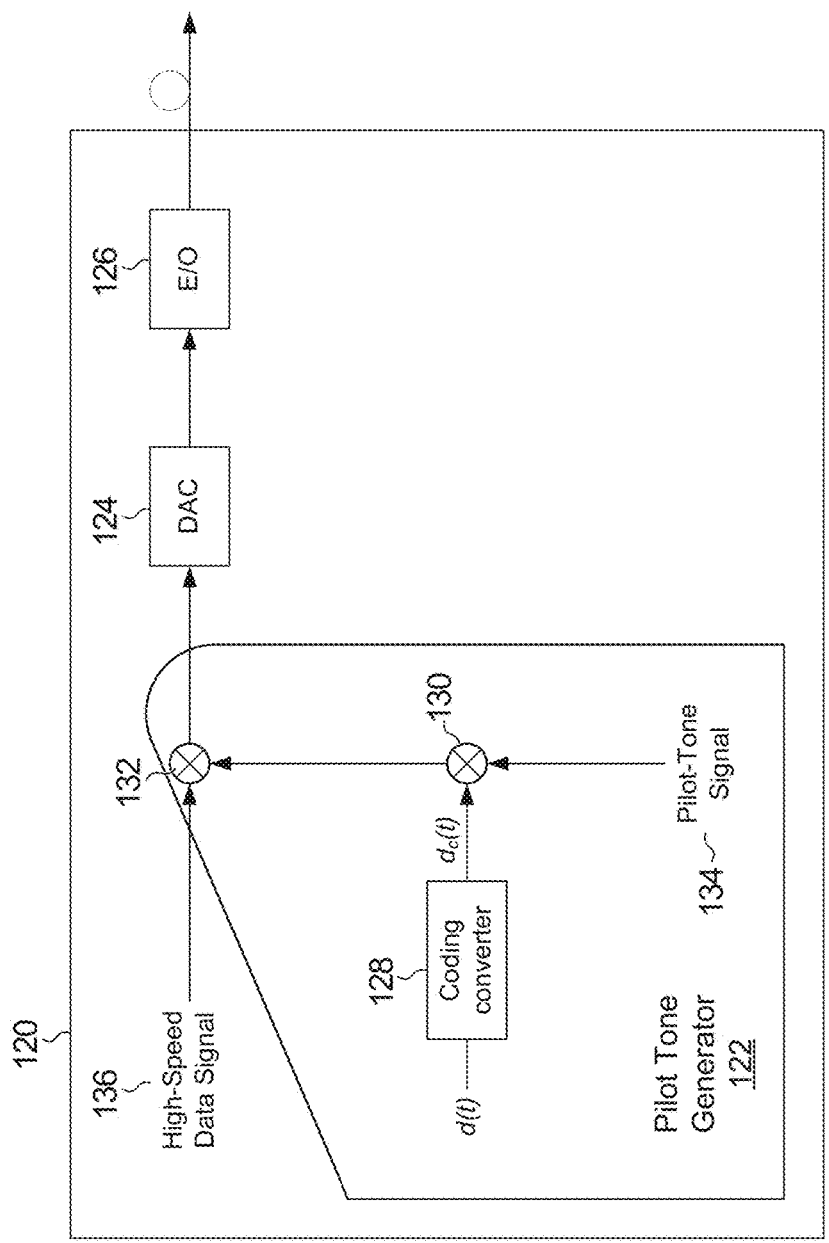
FIG. 3 is a block diagram of an optical transmitter.

FIG. 3 is a block diagram of an optical transmitter 120 configured to generate and modulate pilot data onto a high-speed data signal. The optical transmitter 120 includes a pilot tone generator 122, a digital-to-analog converter (DAC) 124, and an electrical-to-optical converter 126. The pilot tone generator 122 includes a coding converter 128 and two mixers 130 and 132. The optical transmitter 120 may include additional components, but these have been omitted for the sake of clarity.

The pilot tone generator 122 may be implemented by a processor that executes instructions that cause the processor to perform the operations of the pilot tone generator 122. Alternatively, the pilot tone generator 122 may be implemented using dedicated integrated circuitry, such as an application specific integrated circuit (ASIC), a graphics processing unit (GPU), or a programmed field programmable gate array (FPGA) for performing the functions of the pilot tone generator 122. If the pilot tone generator 122 is implemented using dedicated integrated circuitry, then the mixers 130 and 132 may be implemented using multiplication circuits. Example ways in which the DAC 124 may be implemented include using a pulse-width modulator, a binary-weighted DAC, a switched resistor DAC containing a parallel resistor network, etc. An example way in which the electrical-to-optical converter 126 may be implemented is by using a Mach-Zehnder modulator (MZM).

In operation, a pilot tone signal 134 is generated having a frequency $\omega_{PT}$ that is unique to the optical channel on which pilot tone signal is to be modulated. For example, the pilot tone signal may be $m \times \sin \omega_{PT} t$, where m is the modulation depth. The frequency $\omega_{PT}$ is actually an angular frequency, where $\omega_{PT} = 2\pi f$. Pilot data d(t) is also generated, which may be used to identify or characterize the channel. The pilot data d(t) is to be modulated on the pilot tone signal, but it is first encoded using the coding converter 128. The coding converter 128 converts the pilot data bit stream d(t) into a coded bit stream $d_c(t)$ by mapping each bit of d(t) to a corresponding codeword. The coding converter 128 is used to expand the spectrum of the pilot tone 134 and ensure the pilot tone has power during each time interval in which d(t)=0.

Figure 4:
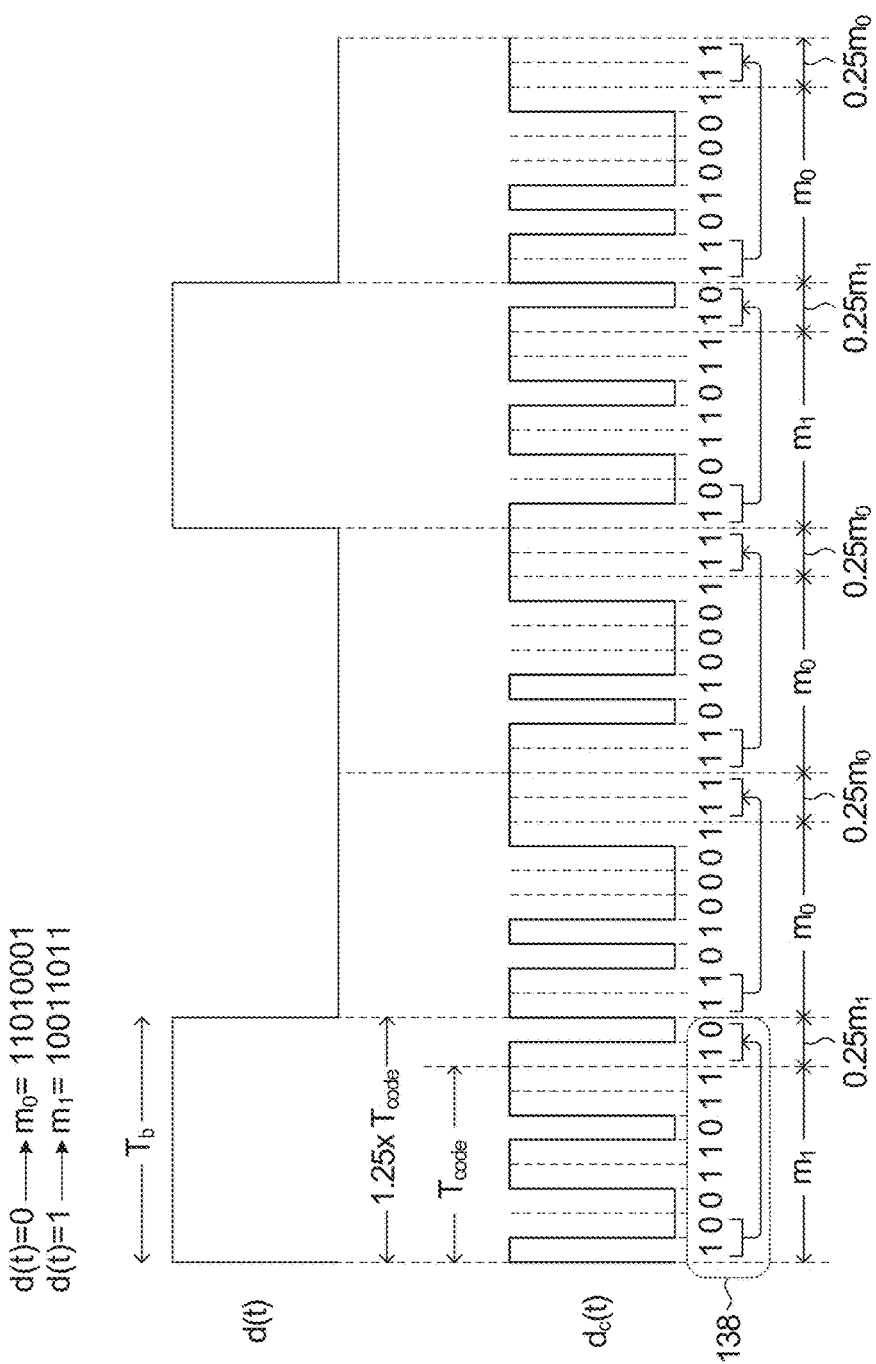
FIG. 4 illustrates one example way in which the pilot data bit stream is mapped to a corresponding coded data bit stream.

FIG. 4 illustrates one example way in which the data bit stream d(t) is mapped to a corresponding coded data bit stream $d_c(t)$. In this example, each data bit in d(t) is mapped to a corresponding 8-bit codeword. An 8-bit codeword is being used for ease of explanation. In actual implementation, the length of the codeword may be much longer. Also, only five bits of data bit stream d(t) are illustrated in FIG. 4 for ease of explanation.

As shown in FIG. 4, data bit '0' is mapped to $m_0$=11010001, and data bit '1' is mapped to $m_1$=10011011. However, for each bit duration $T_b$ in d(t), the corresponding time duration in $d_c(t)$ is $(1+F)T_c$, where $T_c$ is the duration of the codeword. The first $F \times T_c$ portion of the codeword is repeated at the end of $T_c$ so that $T_b = T_c + F \times T_c$. In the illustrated example, F=0.25, i.e. the first quarter of each codeword is repeated at the end of each codeword. For example, as shown at 138, d(t)=1, and so codeword $m_1$=10011011 is used for the corresponding duration in $d_c(t)$ along with the first two bits of $m_1$ ("10") being repeated and appended to the end of $m_1$.

The exact value of F to use is implementation specific, but typically $0 < F \leq 1$. F could be greater than 1, but that would decrease the bandwidth of the pilot tone data. Having a non-zero value of F assists in the correlation operation of the pilot data detection. In the examples described below F=0.25, but a different value of F may be used instead.

Returning to FIG. 3, the coded data $d_c(t)$ is modulated onto the pilot tone signal 134 via the mixer 130, and the resulting signal is modulated onto a high-speed data signal 136 via the mixer 132. By "high-speed" data signal 136, it is meant that the data signal has a frequency substantially higher than the frequency of the pilot tone. For example, the pilot tone signal 134 may have a frequency on the order of kilohertz (kHz) or megahertz (MHz), whereas the high-speed data signal 136 may have a frequency on the order of gigahertz (GHz). The modulated high-speed signal is then converted to analog via DAC 124 and converted into an optical signal having carrier wavelength A via electrical-to-optical converter 126. The optical signal is then multiplexed with other optical channels (not shown), e.g. in a ROADM.

Note that for ease of explanation only one high-speed data signal 136 and DAC path has been illustrated in FIG. 3. In some implementations, e.g. in a coherent optical transmitter, there may be four high-speed data signals respectively corresponding to the in-phase (I) component of the X polarization, the quadrature phase (Q) component of the X polarization, the I component of the Y polarization, and the Q component of the Y polarization. A pilot tone signal carrying coded pilot data may be modulated onto each one of the four high-speed data signals. The frequency of the pilot tone may be the same or different for each one of the four signals.

The optical transmitter 120 of FIG. 3 is only an example, and other transmitter configurations are possible. For example, the coding converter 128 may be removed and the pilot tone signal 134 may instead be mixed with a spectrum expanding code prior to d(t) being modulated onto the signal. Also, only one optical transmitter corresponding to one optical channel is illustrated in FIG. 3. The WDM signal carried on the optical link would have a plurality of optical channels, each carrying a pilot tone of a different frequency.

Figure 5:
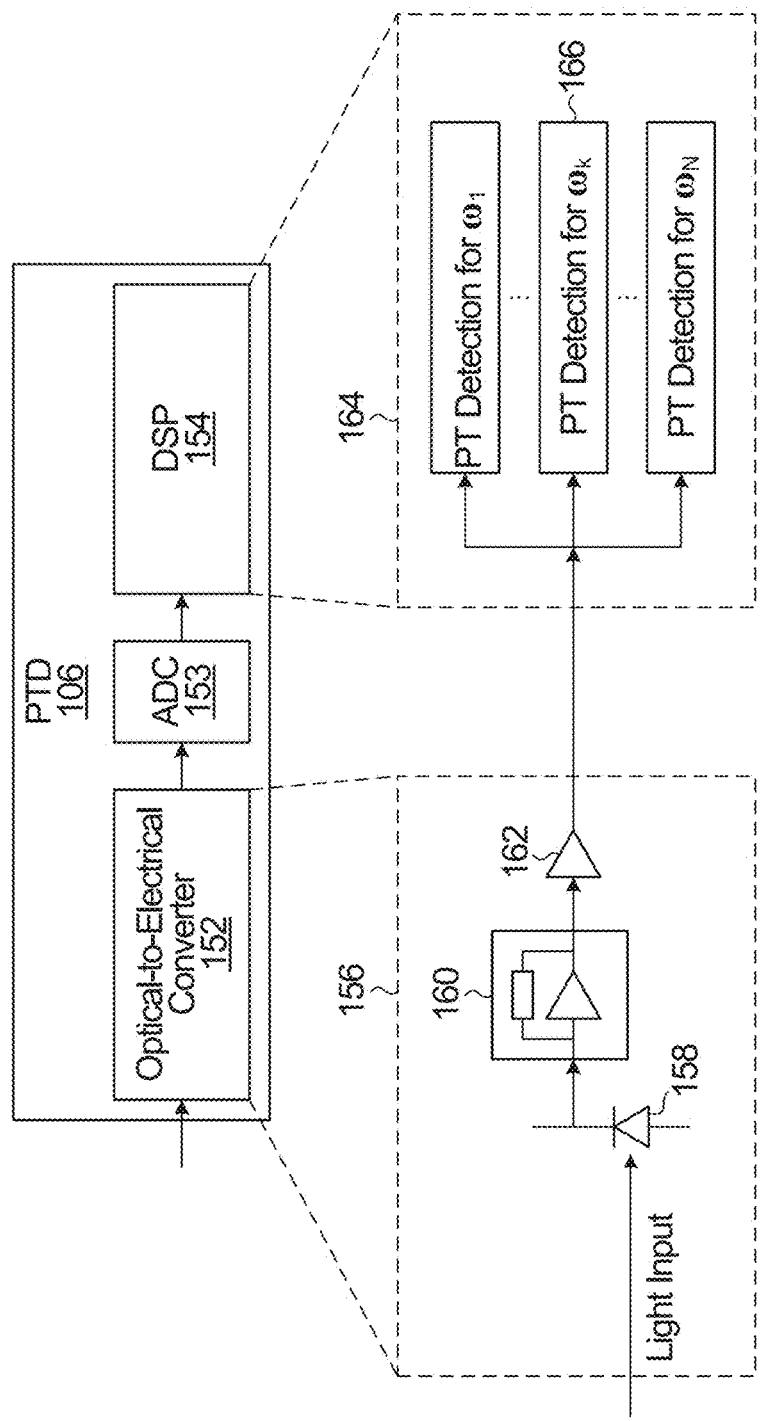
FIG. 5 is a block diagram of a pilot tone detector, according to one embodiment.

FIG. 5 is a block diagram of a PTD 106, according to one embodiment. The PTD 106 includes an optical-to-electrical converter 152 and a digital signal processor (DSP) 154, with an analog-to-digital converter (ADC) 153 interposed therebetween.

An example structure for the optical-to-electrical converter 152 is illustrated in a stippled box 156. The optical-to-electrical converter 152 includes a photodiode 158, which is coupled to a transimpedance amplifier (TIA) 160, which is coupled to an operational amplifier ("op-amp") 162.

The ADC 153 converts an analog electrical signal into a digital electrical signal, and the ADC 153 may be implemented using a sampler that samples the input analog electrical signal according to a clock. The DSP 154 may be implemented by a processor that executes instructions that cause the processor to perform the operations of the digital signal processing. Alternatively, the DSP 154 may be implemented using dedicated integrated circuitry, such as an ASIC, a GPU, or an FPGA for performing the digital signal processing.

In operation, a WDM signal from an optical fiber is received at the optical-to-electrical converter 152 and converted into an electrical signal. The electrical signal is then converted into a digital signal using ADC 153, and then processed using digital signal processing in DSP 154 to perform pilot data detection for each of the optical channels of the received optical signal. The photodiode 158 used in the optical-to-electrical converter 152 is low speed such that it mostly cannot detect the high-speed data on the optical signal. Therefore, the high-speed data component is substantially filtered out, and the output of the optical-to-electrical converter 152 is an electrical signal that includes the pilot data for each channel.

Example processing blocks illustrating some of the processing performed by the DSP 154 are illustrated in stippled box 164. The DSP 154 implements digital signal processing operations to perform pilot tone (PT) data detection for each one of the pilot tone frequencies $\omega_1$ to $\omega_N$, e.g. one PT frequency corresponding to a respective optical channel. For example, the PT detection block for detecting pilot data modulated on a pilot tone of frequency $\omega_k$ is shown at 166. Pilot tone data detection is performed independently for each optical channel because the start time of each codeword is not synchronized between optical channels.

Figure 6:
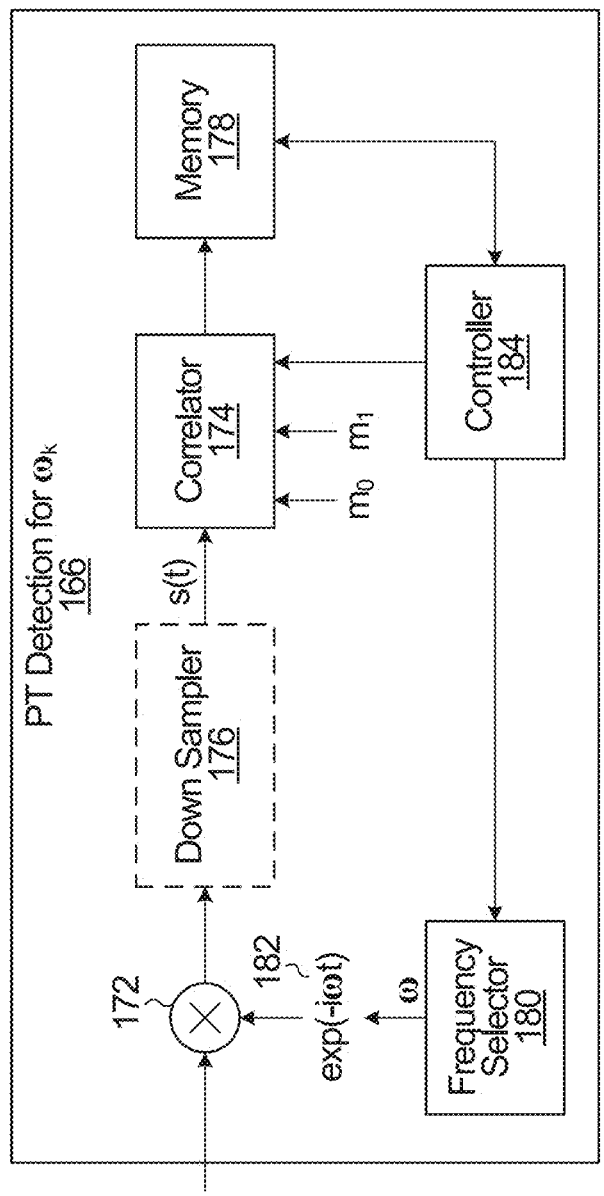
FIG. 6 illustrates a pilot detection block in more detail.

FIG. 6 illustrates PT detection block 166 in more detail. The PT detection block 166 includes a multiplier 172, coupled to a correlator 174, with a down-sampler 176 optionally interposed therebetween. The correlator 174 stores values in a memory 178. A frequency selector 180 controls the frequency of a down-shifting factor 182. A controller 184 controls the operation of the correlator 174 and the frequency selector 180.

The memory 178 may be implemented as physical registers or any other type of data storage. The other components of the PT detection block 166 are part of the digital signal processing of the DSP 154 which, as mentioned above, may be implemented using a processor or dedicated integrated circuitry.

In operation, the input electrical signal is mixed with the down-shifting factor 182 in order to shift the signal frequency down to around DC. The frequency $\omega$ of the down-shifting factor 182 is set based on the frequency $\omega_k$ of the pilot tone being detected, and ideally $\omega=\omega_k$. However, the exact value of $\omega_k$ and $\omega$ can deviate slightly based on the tolerance specifications of the clocks respectively used for generating $\omega_k$ and $\omega$, and so the PT detection block 166 does not know the optimal value $\omega$ to use. Therefore, as explained below, the correlation operation described below is repeated for multiple frequencies $\omega$ within a range around $\omega_k$.

The down-shifted signal is optionally down-sampled using the down-sampler 176 in order to reduce the number of samples associated with each received bit of $d_c(t)$. For ease of explanation, it will be assumed that the down-sampler 176 is present and down-samples the down-shifted signal so that each received bit of $d_c(t)$ is associated with two samples on average. In actual implementation, each codeword bit (also called a codeword chip) may be represented using more samples, e.g. 8 samples per chip. The output of the down-sampler 176 is a stream of samples s(t) corresponding to received coded bit stream $d_c(t)$, with each received bit of coded bit stream $d_c(t)$ corresponding to two samples in this example. The stream of samples s(t) is then input into the correlator 174, which may perform frequency or time correlation to determine the maximum correlation peak, which occurs at a particular phase. In the embodiments described below, the phase is a sample position within a codeword duration. Also, in the embodiments described below, time correlation will be assumed.

The stream of samples s(t) includes a stream of received codewords $\{m_0, m_1\}$, e.g. the codewords shown earlier in FIG. 4, and each codeword has a codeword duration $T_c$. The correlator 174 correlates each set of samples in s(t) of duration $T_c$ with each one of the two possible codeword values $m_0$ and $m_1$. However, the correlator 174 does not know where each codeword starts in received stream s(t). Therefore, multiple correlations are performed in a stepwise fashion using overlapping windows, and the sample position at which the magnitude of the correlation value is largest is determined as the sample position of the correlation peak. That is, the correlation peak is the point at which the correlation magnitude is largest, and the correlation peak occurs at a particular sample position in the codeword duration $T_c$. As mentioned above, the sample position is also called the phase. The sample position is also called the sample index, and the expression sample index will be used in embodiments described below.

The step size, i.e. the distance between the start of adjacent overlapping correlation windows, is $F \times T_c$, which means that the number of overlapping windows within and corresponding to one bit of d(t) is (1+F)/F. Therefore, for each received bit of pilot data d(t) there are (1+F)/F correlation calculations for each one of the two possible codeword values $m_0$ and $m_1$. For each received bit of pilot data d(t): after all of the correlation measurements are performed, the correlation value with the largest magnitude is stored in memory 178 as the correlation peak for the received bit of d(t), along with the sample index in the codeword at which the correlation peak occurred, and also along with the frequency $\omega$.

Figure 7:
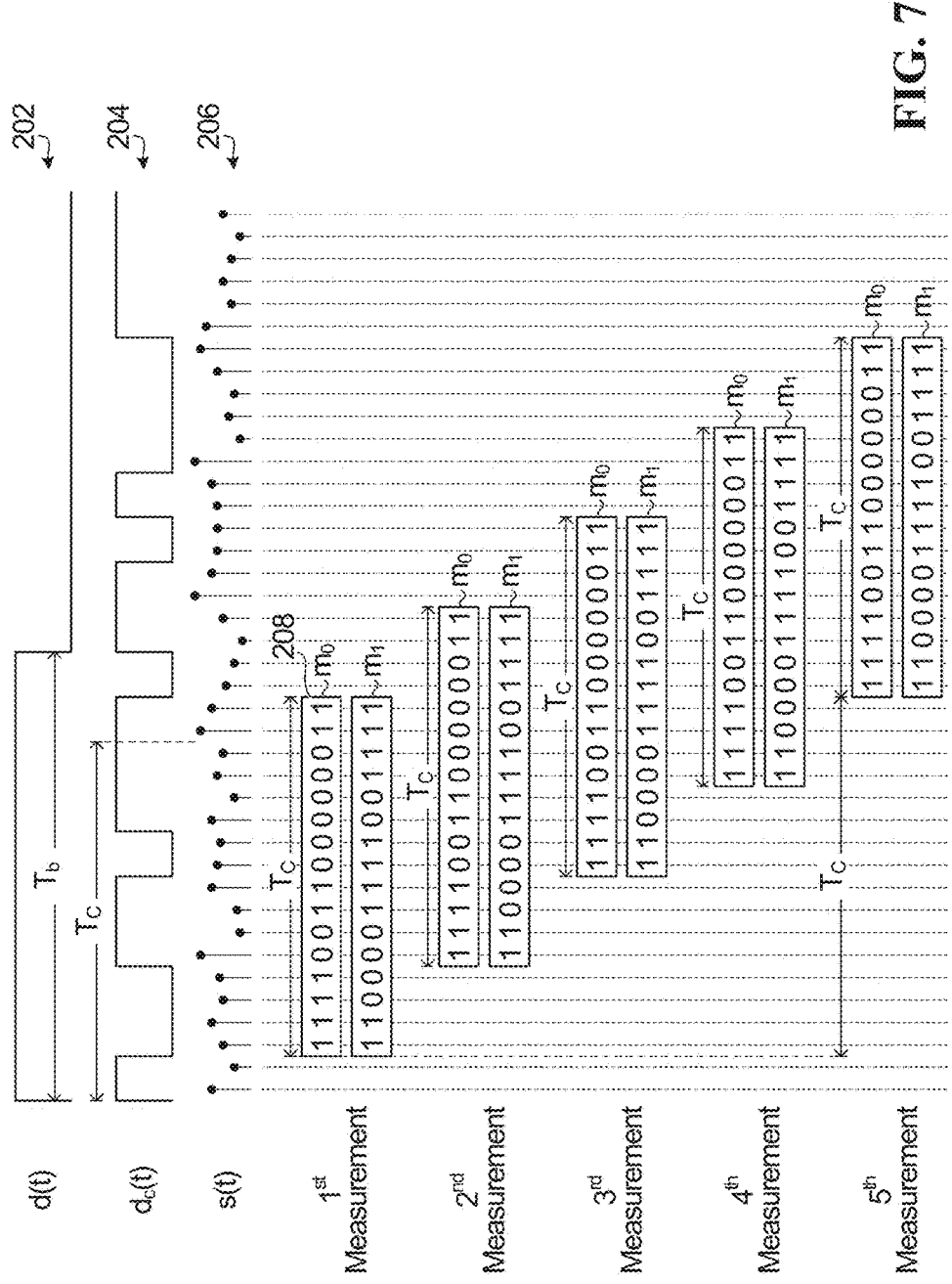
FIG. 7 illustrates an example of correlation measurements.

To assist in better understanding the correlation operation described above, an example will be explained with respect to FIG. 7. FIG. 7 illustrates two bits of pilot data d(t) at 202. The eight-bit codewords shown in FIG. 4 are transmitted as part of $d_c(t)$, and F=0.25, such that the corresponding coded pilot data stream $d_c(t)$ is illustrated at 204. The down-sampler 176 down samples the received signal such that on average there are two samples for each received codeword bit. As mentioned above, two samples for each received codeword bit is just an example for ease of explanation, and it may not be enough samples per codeword bit in actual implementation. The stream of received samples s(t) (after down sampling) is shown at 206. Because F=0.25, the step size of each correlation window is $0.25 \times T_c$, which means that the number of overlapping windows within and corresponding to one bit of d(t) is (1+F)/F=5. Therefore, for each received bit of pilot data d(t) there are (1+F)/F=5 correlation calculations for each one of the two possible codeword values $m_0$ and $m_1$. Each correlation calculation will be referred to as a "correlation measurement". The five measurements corresponding to the first bit of the pilot data d(t) 202 are illustrated in FIG. 7. For each measurement, a cyclic (circular) cross-correlation operation between c(t) and s(t) is performed, where c(t) represents either codeword $m_0$ or $m_1$. The cyclic cross-correlation operation is performed twice: once with c(t)=$m_0$, and then again with c(t)=$m_1$. When a cyclic cross-correlation is performed, the output is 16 values in this example since the codeword length is 8 bits and there are 2 samples per codeword bit, i.e. 16 samples in total for each codeword. For a cyclic cross-correlation between a particular codeword c(t) of 16 samples and the corresponding 16 samples of s(t) in the measurement window, the output of the cyclic cross-correlation is as follows:

$$y(1) = c(1)s(1) + c(2)s(2) + \ldots + c(16)s(16),$$

$$y(2) = c(1)s(2) + c(2)s(3) + \ldots + c(16)s(1),$$

$$\ldots$$

$$y(16) = c(1)s(16) + c(2)s(1) + \ldots + c(16)s(15)$$

As shown in FIG. 7, the first measurement does not in general align with the beginning of the bit of d(t) because the correlator 174 does not know exactly where in the stream of received samples s(t) each bit of d(t) begins. However, by having the five measurements stepped apart over the duration of a received pilot data bit, and with the repeated portion of $T_c$ appended to the end of each codeword in $d_c(t)$, at least one of the five measurement should contain a complete code and reveal the maximum correlation peak at a particular sample index.

Also, because on average every two samples of the received down sampled stream s(t) corresponds to a bit of $d_c(t)$, the codeword $m_0$ or $m_1$ used in the correlation operations is mapped to a corresponding string of values equal in length to the number of sampled values by repeating each codeword bit by an amount equal to the average number of samples per codeword bit. For example, codeword $m_0$=11010001 is mapped to a string of values twice the length of the codeword by repeating each bit of the codeword twice, i.e. c(t)=1111001100000011, as shown at 208. Also, although the bits in c(t) are illustrated and described as bits having values "1" and "0", in actual implementation, the bit "1" may be a real number or integer greater than zero (e.g. "+1") and the "0" may be a real number or integer less than zero (e.g. "−1").

Figure 8:
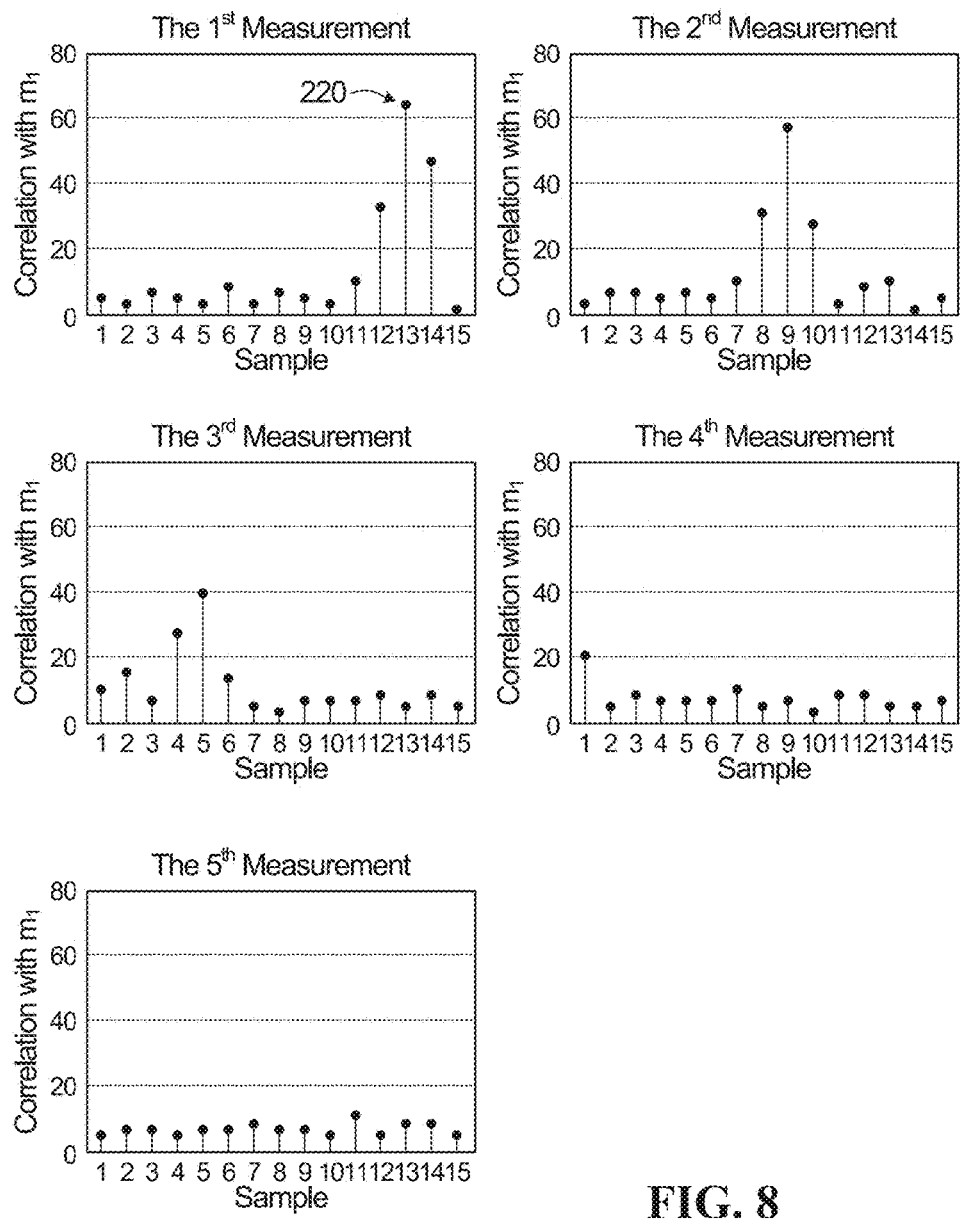
FIG. 8 illustrates a plot of correlation magnitude versus sample index for each one of the five measurements in FIG. 7.

FIG. 8 illustrates a plot of correlation magnitude versus sample index for each one of the five measurements in FIG. 7 for codeword c(t)=$m_1$. For each one of the five measurements, the magnitude of the correlation peak and its sample index (phase) may be stored in the memory 178. The number of samples in a codeword is 16, and the correlation peak will occur at a particular one of the 16 samples for each measurement. The correlator 174 then chooses, from the five measurements, the correlation peak of largest magnitude and its corresponding sample index. In the example of FIG. 8, the correlation peak of maximum magnitude is shown at 220. The correlation peak of maximum magnitude is obtained during the first measurement, and it is present at sample index 13. The five measurements are repeated for codeword c(t)=$m_0$, but since in this example the first bit of d(t)=1 (which corresponds to codeword $m_1$), the maximum correlation peak should occur when correlation is performed with respect to c(t)=$m_1$, as shown in FIG. 8.

Figure 9:
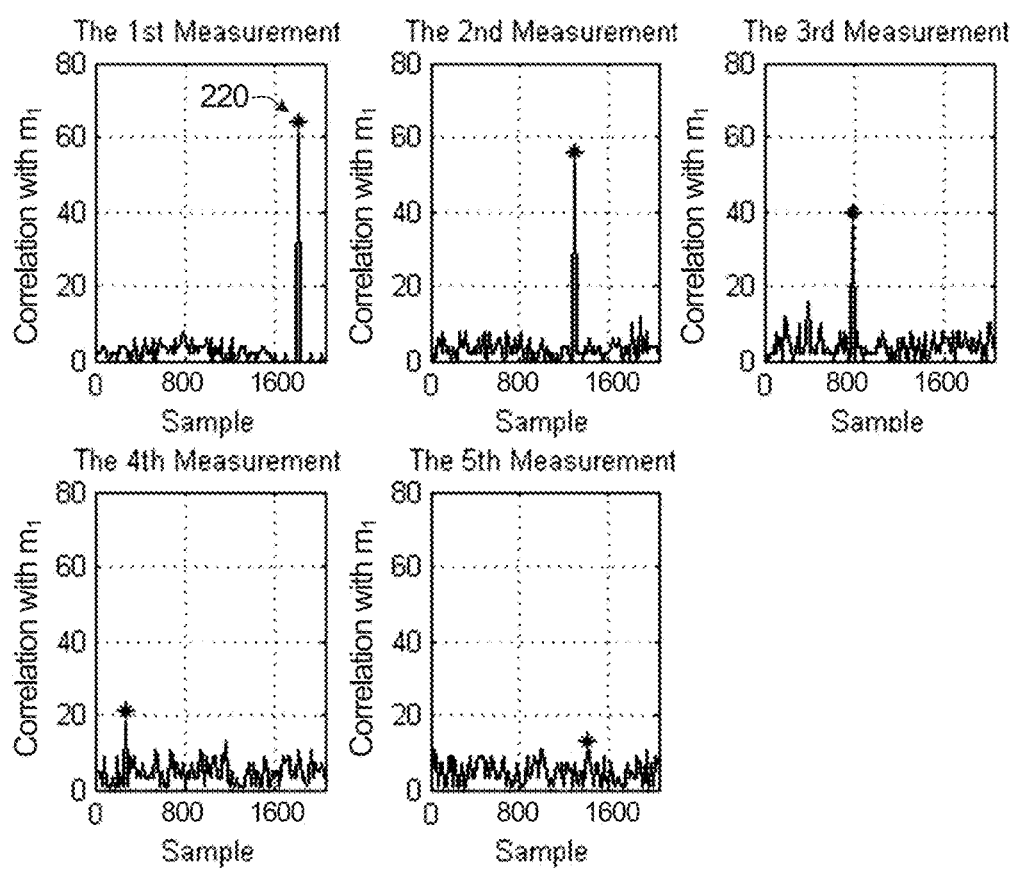
FIG. 9 illustrates the correlation measurements of FIG. 8, but assuming 2000 samples corresponding to each codeword.

The number of samples in the example illustrated in FIGS. 7 and 8 is artificially low in order to assist in explanation. In actual implementation, the number of bits in each codeword $m_0$ or $m_1$ may be much greater than eight, and the number of samples per codeword bit may be greater than two, such that the number of samples corresponding to each codeword may be much greater than sixteen. For example, FIG. 9 illustrates the correlation measurements of FIG. 8, but assuming 2000 samples corresponding to each codeword, e.g. if the number of bits in a codeword were 200 and each codeword bit was on average represented by 10 samples.

Returning to FIG. 6, the controller 184 instructs the correlator 174 to determine the maximum correlation peak for each bit of d(t) in the manner explained above. The correlation peak and its sample index (phase) is stored in the memory 178. However, the correlation operation described above that is performed by the correlator 174 is performed after down-shifting by down-shifting factor 182 having frequency ω, and the frequency ω of the downshifting factor 182 may not be an exact match of pilot tone at frequency $ω_k$ due to the tolerance specifications of the clocks respectively used for generating $ω_k$ and ω. Therefore, the correlator 174 repeats the operation described above for different down-shifting frequencies within a range around $ω_k$. The boundaries of the range are determined a priori by the maximum clock difference between the clocks respectively used for generating $ω_k$ and ω. For example, if the pilot tone signal 134 in FIG. 3 is generated to have a frequency $ω_k$=2π(5×$10^6$) rad/s, but the tolerance specifications of the optical transmitter have a range of 20 parts per million (PPM), then the frequency of the pilot tone is actually going to be somewhere between 2π(5×$10^6$)±2π(1×$10^3$) rad/s. If the frequency ω of down-shifting factor 182 in FIG. 6 is also set to ω=2π(5×$10^6$) rad/s, but the tolerance specifications of the clock for generating ω is 50 PPM, then the frequency actually generated is 2π(5×$10^6$)±2π(2.5×$10^3$) rad/s. Therefore, an exact match between ω and the pilot tone frequency $ω_k$ is within a range of ±2π(3.5×$10^3$) rad/s around 2π(5×$10^6$) rad/s. Therefore, the controller 184 instructs the frequency selector 180 to step frequencies between a lower frequency bound $ω_L$ (e.g. $ω_L$=2π(5×$10^6$)−2π(3.5×$10^3$) rad/s) and an upper frequency bound $ω_U$ (e.g. $ω_U$=2π(5×$10^6$)+2π(3.5×$10^3$) rad/s). For each frequency step $ω_L$≤ω≤$ω_U$, the controller 184 instructs the correlator 174 to perform the correlation operation described earlier and record the maximum correlation peak and its sample index in memory 178. Then, once the correlation operation has been completed for each frequency step, the controller 184 chooses the maximum correlation peak of all the recorded maximum correlation peaks, and stores the magnitude of that correlation peak, its sample index, and the down-shifting frequency ω at which that correlation peak was determined. In summary, the maximum correlation peak is determined and stored for each frequency step within the frequency scanning range $ω_L$≤ω≤$ω_U$, and then the maximum of the maximum correlation peaks is selected. The selected correlation peak may then be used by the DSP 154 for downstream operations, such as recovering the pilot data d(t).

The frequency step size is implementation specific, but as an example it may be chosen such that there are nine steps between the lower frequency bound $ω_L$ and the upper frequency bound $ω_U$. In some embodiments, for a codeword duration of $T_c$, the frequency step size Δω should be small enough so that the pilot tone frequency is not missed. The normalized correlation peak amplitude depends on the frequency error Δf as $$\left| \frac{\sin(\pi \Delta f T_c)}{\pi \Delta f T_c} \right|.$$

Therefore, in some embodiments, to not miss the pilot tone frequency, $\Delta f T_c$ is less than ½, e.g. less than ¼.

Figure 10:
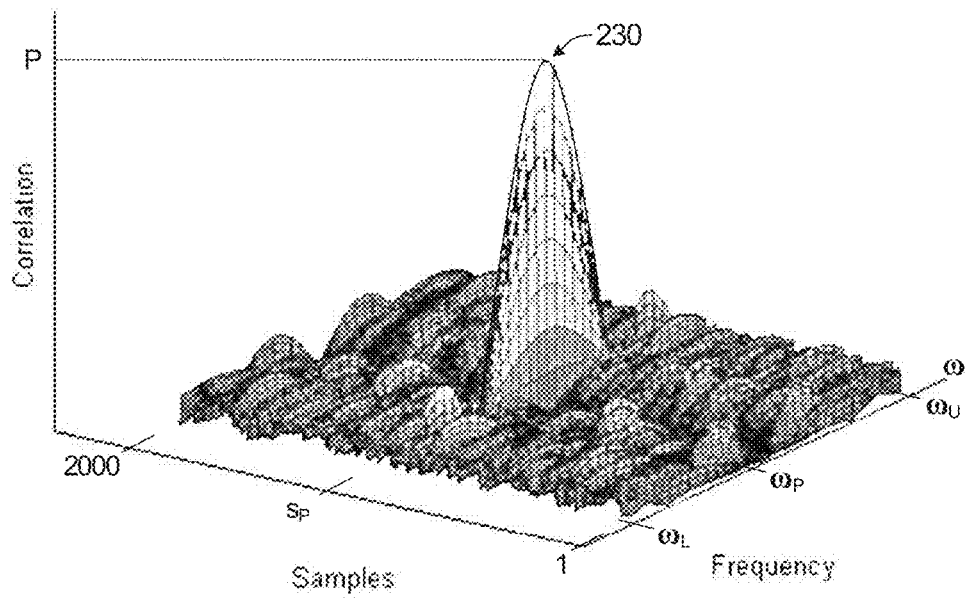
FIGS. 10 and 11 each illustrate a plot of correlation values for an $i^{th}$ correlation measurement.

The operation of the PT detection 166 described above with respect to FIGS. 6 to 9 may work well in high SNR conditions. However, in low SNR conditions, a spike in noise may result in a correlation peak being computed having a magnitude greater than the magnitude of the correlation value resulting from the codeword being correlated with the received data bit. For example, FIGS. 10 and 11 each illustrate a plot of correlation values for an $i^{th}$ correlation measurement for each of the frequency values within the frequency scanning range $\omega_L \le \omega \le \omega_U$, and assuming 2000 samples per codeword. FIG. 10 is the correlation plot in high SNR conditions, and as shown at 230, a clear correlation peak P emerges at a particular sample index $s_P$, and at a particular downshifting frequency $\omega_P$.

Figure 11:
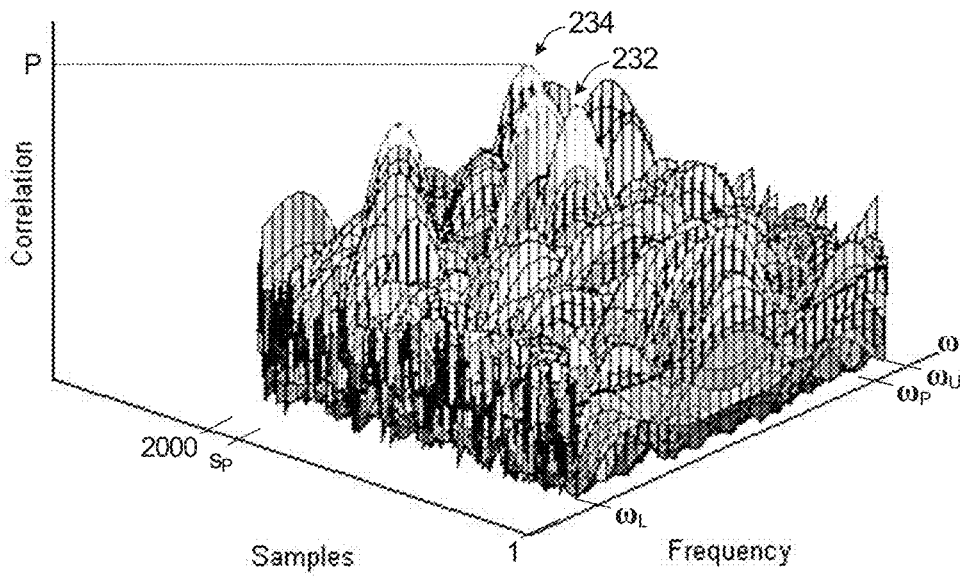

FIG. 11 is the correlation plot in low SNR conditions. If noise could be disregarded, then the actual correlation peak from the correlation with the correct codeword would be at 232, but the noise causes multiple correlation peaks of similar or greater magnitude at different frequencies and sample indices. The maximum correlation peak is at 234, and this maximum correlation peak is what would be determined using the method described above. However, the maximum correlation peak 234 is actually just a transient noise spike and is not at the correct sample index or frequency. If downstream operations are performed using the maximum correlation peak 234, then a large power error and/or bit error may occur. Also, any state machine relying on correlation peak 234 to perform subsequent operations may become unreliable because the correlation peak 234 is from a noise spike. Note that maximum peak averaging at low SNR may not work well because the noise may cause a false peak. Also, averaging over the whole frequency and sample range may not work well due to computational complexity and possible peak drift due to frequency differences between the pilot tone detector clock and the optical transmitter clock, which may lead to a large power error.

Figure 12:
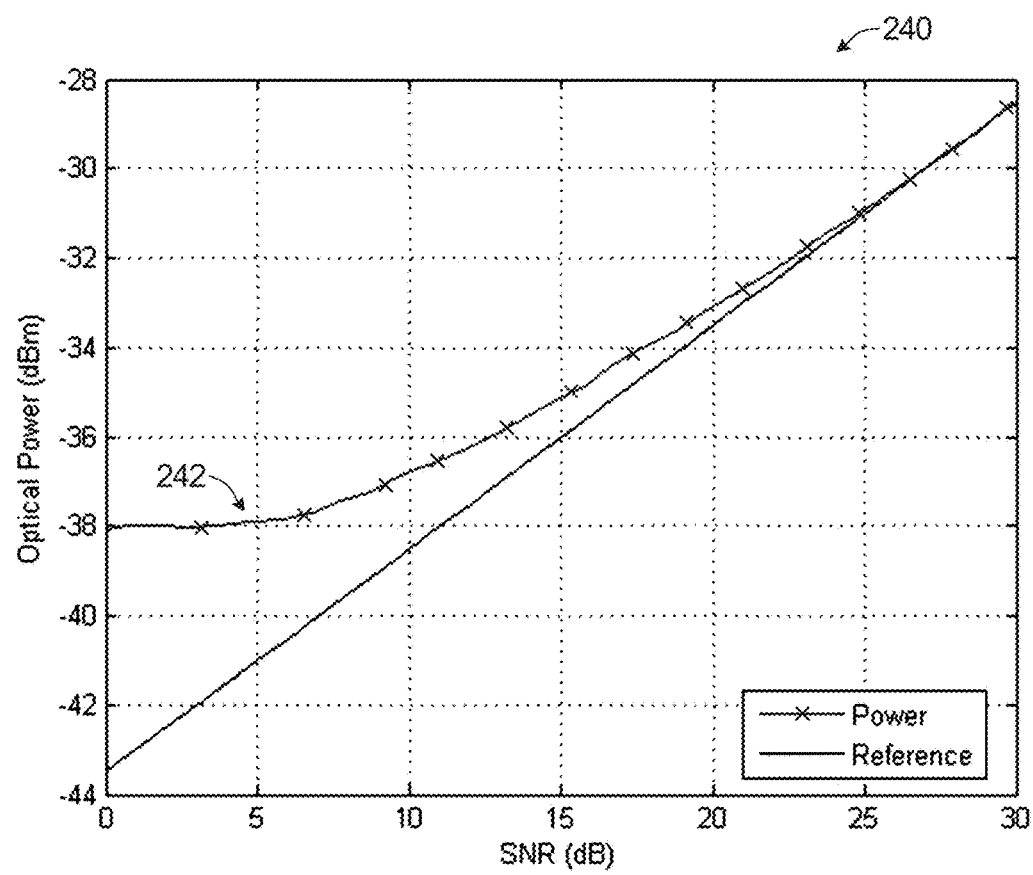
FIG. 12 illustrates a plot of optical power for different SNR.

FIG. 12 illustrates a plot 240 of optical power for different SNR. In low SNR conditions, e.g. SNR below 10 dB, there is a noise floor 242. The noise from this noise floor 242 may be mistaken as the pilot data signal and a maximum correlation peak may be chosen that is based on the noise instead of the pilot data signal.

In FIG. 12, the noise level is fixed, and by increasing the signal power the SNR is increased. The detected power is proportional to the SNR when the SNR is high. Since the power is based on the maximum correlation peak, when the SNR is low, the actual correlation peak may be buried in the noise floor 242. For SNR under a certain value, the power may not be detected correctly due to the noise floor 242. Also, to reduce the pilot-tone introduced penalty, the modulation depth may be small, and thus the SNR of pilot tone may not be very high. Therefore, it may be important to accurately detect the power in low SNR conditions. The reference line in FIG. 12 is the actual optical power. It can be seen that there is large power error at low SNR.

To try to assist in low SNR conditions, the controller 184 of FIG. 6 therefore performs tracking of the maximum correlation peak over time in the manner described below. Unlike the pilot data signal, noise is typically more transient in nature. Therefore, if a maximum correlation peak does not actually correspond to the pilot data signal, but instead corresponds to noise, then the correlation peak should disappear over time when tracked. A search for a new maximum correlation peak may then be performed.

Figure 13:
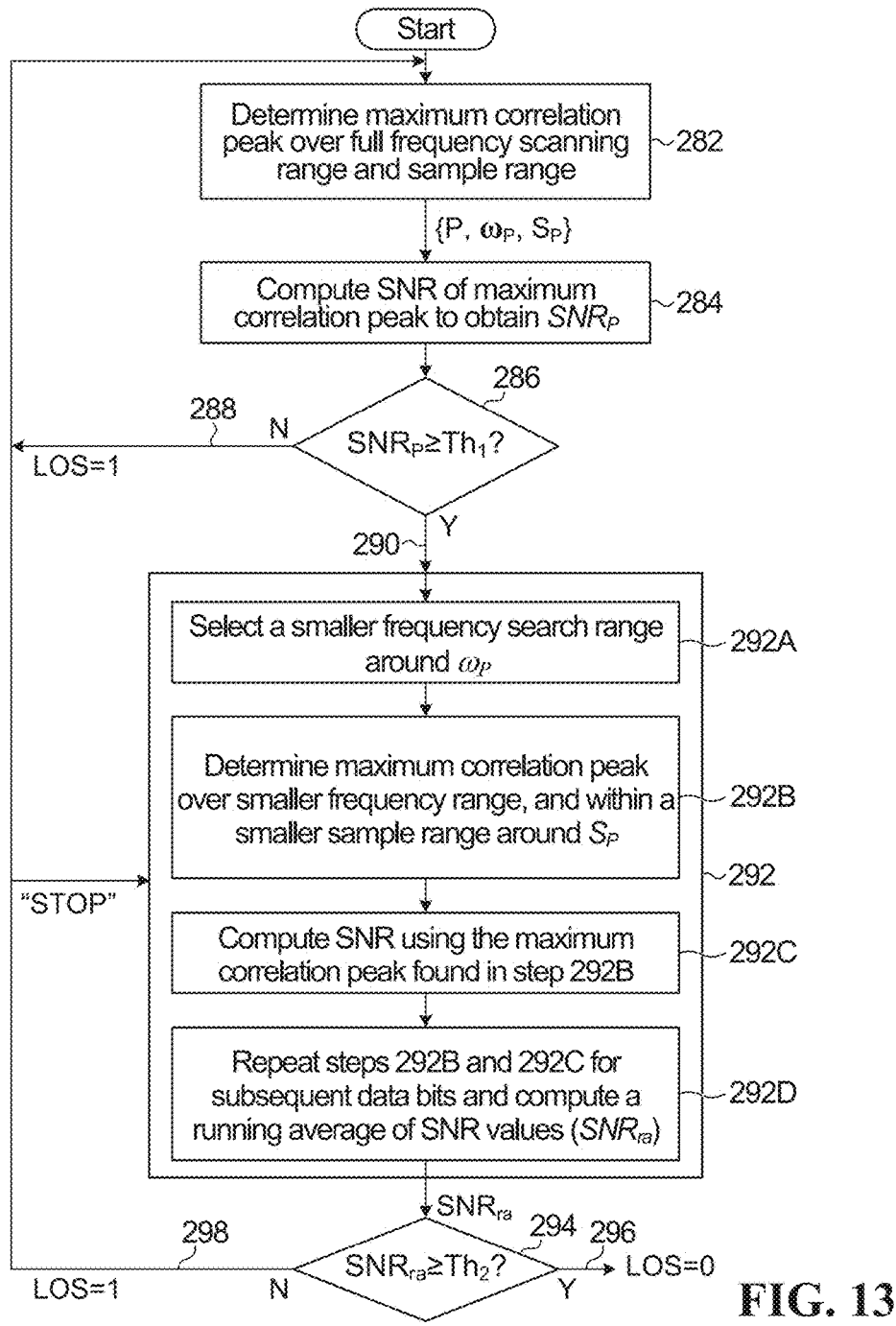
FIG. 13 is a method performed by a controller, according to one embodiment.

FIG. 13 is a method performed by the controller 184, according to one embodiment. In step 282, for a particular data bit of the pilot data d(t), a search is performed over the frequency scanning range to determine the maximum correlation peak. Step 282 is performed in the manner described in detail above, and is summarized as follows. A full frequency scanning range $\omega_L \le \omega \le \omega_U$ is obtained based on the maximum clock difference between the clocks respectively used for generating $\omega_k$ and $\omega$. The downshifting frequency $\omega$ is stepped from $\omega_L$ to $\omega_U$. For each downshifting frequency co, the correlator 174 performs the correlation operation to determine the maximum correlation peak and its sample index. The result is a set of correlation peak values consisting of a respective maximum correlation peak determined for each frequency value $\omega$. The maximum of the set is then chosen as the maximum correlation value.

The result after step 282 is a selected maximum correlation peak having a correlation peak value of a particular magnitude ("P"), which is the largest magnitude of all of the correlation peaks determined in step 282. The selected maximum correlation peak occurs at a corresponding downshifting frequency $\omega_P$, and at a sample index $s_P$. For example, in the high SNR conditions shown in FIG. 10, the maximum correlation value chosen would be 230, assuming FIG. 10 illustrates the measurement having the correlation value of the largest magnitude. The peak value of the selected maximum correlation peak is "P", which occurs at down-shifting frequency $\omega_P$, and at a sample index $s_P$. In the low SNR conditions shown in FIG. 11, the maximum correlation value chosen would be 234, again assuming FIG. 11 illustrates the measurement having the correlation value of largest magnitude.

In step 284, the SNR of the maximum correlation peak output from step 282 is computed and designated as $SNR_P$. The value $SNR_P$ is an "instantaneous" or "bit" SNR because it is the SNR corresponding to one particular data bit in pilot data d(t), not an average SNR value computed over multiple data bits of the pilot data d(t). In one embodiment, $SNR_P$ is computed as the ratio of the correlation peak power and the average power of the noise, where noise is the correlation values excluding the correlation peak and a few points around it. In one embodiment, the number of points excluded around the correlation peak is equal to the number of samples used to represent a codeword bit.

In step 286, the value $SNR_P$ is compared to a SNR threshold value $Th_1$. If $SNR_P < Th_1$, as at 288, then the controller 184 decides that the SNR of the data bit, based on the maximum correlation peak, is too low to actually correspond to the pilot signal, and the method returns to step 282 to try to determine a new maximum correlation peak for the next bit of the pilot data d(t). The controller 184 decides that there is currently no pilot signal, and indicates this in a flag: "LOS=1", where "LOS" stands for "loss of signal". If the pilot signal is actually lost, e.g. because of a failure in the optical network, then the method may never progress beyond step 286, except for situations in which noise is mistaken as the pilot signal. A persistent LOS=1 signal may be acted upon by an optical network management entity.

If in step 286 $SNR_P \ge Th_1$, as at 290, then the method proceeds to step 292. In step 292, the selected maximum correlation peak is "P" is tracked and a running SNR is computed. Step 292 includes the following operations.

In step 292A, a smaller frequency search range around frequency $\omega_P$ is selected, i.e. $\omega_{PL} \le \omega \le \omega_{PU}$, where $\omega_{PL} > \omega_L$, $\omega_{PU} < \omega_U$, and $\omega_{PL} \le \omega_P \omega_{PU}$. For example, the full frequency range searched in step 282 may be $2\pi(7 \times 10^3)$ rad/s around the pilot tone frequency $\omega_k$, whereas the smaller frequency range selected in 292A may be $2\pi(2\times10^3)$ rad/s around the frequency $\omega_P$ of the maximum correlation peak found in step 282, e.g. $\omega_{PL}=\omega_P-2\pi(1\times10^3)$ and $\omega_{PU}=\omega_P+2\pi(1\times10^3)$.

In some embodiments, the step size within the smaller frequency range may be chosen so that the correlation peak error is acceptable, where the correlation peak error in dB is given by $$\Delta P_{dB} = 10\log_{10}\left|\frac{\sin(\pi\Delta fT_c)}{\pi\Delta fT_c}\right|.$$

In some embodiments, the number of steps within the smaller frequency range may be the same as the number of steps within the full frequency range, such that the granularity between adjacent frequencies is smaller in the smaller frequency search range. For example, the full frequency range searched in step 282 may have five steps: $\omega_k-2\pi(3.5\times10^3)$ rad/s, $\omega_k-2\pi(1.75\times10^3)$ rad/s, $\omega_k$, $\omega_k+2\pi(1.75\times10^3)$ rad/s, and $\omega_k+2\pi(3.5\times10^3)$ rad/s. That is, in step 282 the correlation performed by correlator 174 is repeated five times for each of the following five down-shifting frequencies: $\omega_k-2\pi(3.5\times10^3)$ rad/s, $\omega_k-2\pi(1.75\times10^3)$ rad/s, $\omega_k$, $\omega_k+2\pi(1.75\times10^3)$ rad/s, and $\omega_k+2\pi(3.5\times10^3)$ rad/s. The smaller frequency range in step 292 then also has five step sizes: $\omega_p-2\pi(1\times10^3)$ rad/s, $\omega_p-2\pi(0.5\times10^3)$ rad/s, $\omega_p$, $\omega_p+2\pi(0.5\times10^3)$rad/s, and $\omega_p+2\pi(1\times10^3)$ rad/s. The frequency step spacing granularity is smaller: $2\pi(0.5\times10^3)$ rad/s between adjacent frequencies compared to $2\pi(1.75\times10^3)$ rad/s between adjacent frequencies in step 282. The frequency step spacing granularity is smaller because the same number of frequency steps is being defined in a smaller frequency range. Therefore, step 282 may be referred to as a coarse frequency correlation peak search, and the operations described in relation to step 292 may be defined as a fine frequency correlation peak search. Using a coarser frequency search in step 282 may save computational resources. In other embodiments, the number of steps in the smaller frequency range may be different from the number of steps in the full frequency range, and the frequency step spacing granularity of the smaller frequency range may be the same as or different from the frequency step spacing granularity of the full frequency range. In some embodiments, the number of steps within the full frequency range, i.e. the frequency step spacing granularity of the full frequency range, may be a function of the codeword duration $T_c$. For example, the longer the codeword duration $T_c$, the smaller the step spacing granularity of the full frequency range.

In step 292B, the correlation measurements are made and the maximum correlation peak is determined across each frequency, like in step 282, but for the next bit in pilot data d(t), and with two significant differences: (1) the smaller frequency range around $\omega_P$ and determined in step 292A is used instead of the full frequency range used in step 282; and (2) the search for the maximum correlation peak only occurs in a smaller window of samples around sample index $s_P$: $s_{PL}\leq s_P\leq s_{PU}$. The number of samples within the window of samples around sample index $s_P$ is implementation specific. As one example, if the number of samples corresponding to a codeword is 2000, then the window may be 201 samples: $s_{PL}=s_P-100$ to $s_{PU}=s_P+100$. Any correlation values outside the sample window are ignored. In actual implementation, the sample window may be much smaller, e.g. 21 samples when there are ten samples per codeword bit. The number of samples in the sample window has some flexibility, and there is a trade-off: the number of samples should be large enough to accommodate some drifting of the peak location due to clock drift, but small enough to reduce the impact of noise.

Figure 14:
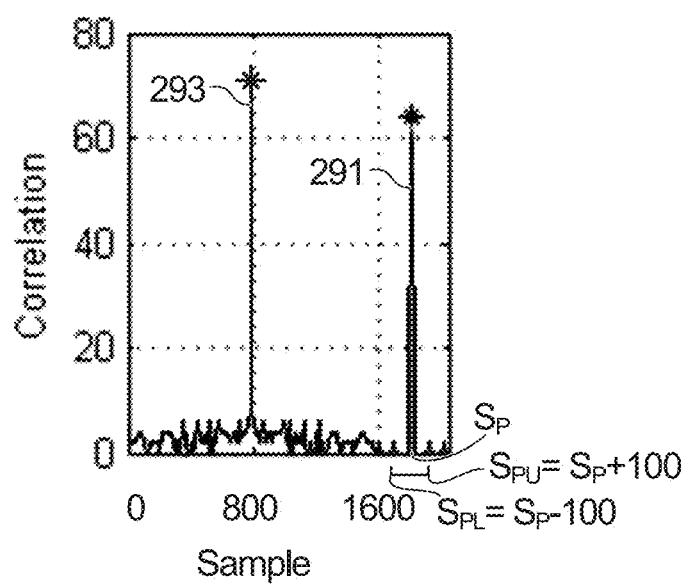
FIG. 14 illustrates one of the correlation measurements made in step 292B of FIG. 13.

FIG. 14 illustrates one of the correlation measurements made by the correlator 174 in step 292B. A peak 291 discovered in step 282 is still present, but due to noise there is another correlation peak 293 at another sample that has a larger magnitude. However, the larger magnitude correlation peak 293 is ignored because it falls outside the smaller range of samples $s_P\pm100$. Peak 291 is considered the maximum correlation peak.

Returning to FIG. 13, in step 292C, the SNR is determined using the maximum correlation peak found in step 292B. In step 292D, steps 292B and 292C are repeated for subsequent pilot data bits in d(t), and a running SNR average is computed over a range of pilot data bits in d(t). The running SNR average is denoted as $SNR_{ra}$ and it is the output of step 292. The value $SNR_{ra}$ changes as each bit of received pilot data stream d(t) is processed. The value $SNR_{ra}$ may be computed by averaging the SNR value determined in step 292C for each of the previous k data bits of received pilot data stream d(t). As one example, k may be 50.

In step 294, the value $SNR_{ra}$ is compared to another SNR threshold value $Th_2$. $Th_2$ is chosen as a minimum signal SNR value, such that if the average SNR of the received signal drops below $Th_2$, then it is considered that the data signal is lost. This would occur if the correlation peak being tracked over the smaller sample window in step 292 was lost. Typically $Th_2<Th_1$, although this does not have to be the case.

If $SNR_{ra}\geq Th_2$, as at 296, then no loss of signal is assumed and the method of steps 292 and 294 continues. Otherwise, if $SNR_{ra}<Th_2$, as at 298, then loss of signal is assumed and indicated. A "Stop" command is also issued to stop the correlation peak tracking of step 292, and the method returns to the beginning of step 282 to search for a new maximum correlation value over the full frequency and sample index range for a next bit of pilot data.

In the method of FIG. 13, it is assumed that the phase of the codewords $m_0$ and $m_1$ are not changed over time at the transmitter, i.e. the same $m_0$ is always sent for d(t)=0 and the same $m_1$ is always sent for d(t)=1; circular shifts of $m_0$ and $m_1$ are not transmitted.

By performing the method of FIG. 13, if the maximum correlation peak originally detected in step 282 corresponds to noise, then that correlation peak, when tracked in step 292 will typically disappear over time due to the transient nature of noise. The disappearance of the correlation peak will cause the $SNR_{ra}$ to drop below $Th_2$, which will cause the method to return to step 282 to find a new maximum correlation peak for a next bit of pilot data. Once a maximum correlation peak is determined that actually corresponds to the pilot data signal, the maximum correlation peak will typically continue to be tracked in step 292 and $SNR_{ra}$ will typically remain above $Th_2$, as long as the signal is not lost (e.g. due to a network failure). Moreover, by ignoring all correlation values outside the smaller sample window in step 292B, any other transient correlation peaks due to noise outside the window will be ignored, e.g. peak 293 will be ignored, as explained earlier with respect to FIG. 14. Also, by optionally having a finer frequency search in step 292B over a smaller frequency range, a more accurate maximum correlation peak magnitude may be obtained. If $\omega_k$ is at a frequency that lies between adjacent frequency steps in the coarse frequency search in step 282, but $\omega_k$ is at a frequency that is equal to or close to one of the frequencies in the fine frequency search in step 292B, then a more accurate maximum correlation peak magnitude may be obtained.

During the method of FIG. 13, correlation peaks are produced for each bit of pilot data, either in step 282 or in step 292B/292D. These correlation peaks are used downstream for detecting the pilot data. In one embodiment, a series of correlation peaks produced during the method of FIG. 13 over the course of several pilot data bit durations, and for each possible transmitted codeword, may be examined by the DSP to detect a pattern of maximum correlation peaks at a particular sample index (phase). The particular sample index may then be used to make a decision as to which pilot data bits were transmitted, e.g. as follows: for each bit of pilot data, if the correlation value at the particular sample index for codeword $m_0$ is larger in magnitude than the correlation value at the particular sample index for codeword $m_1$, then it is decided that pilot data bit "0" was transmitted; otherwise, it is decided that pilot data bit "1" was transmitted.

Figure 15:
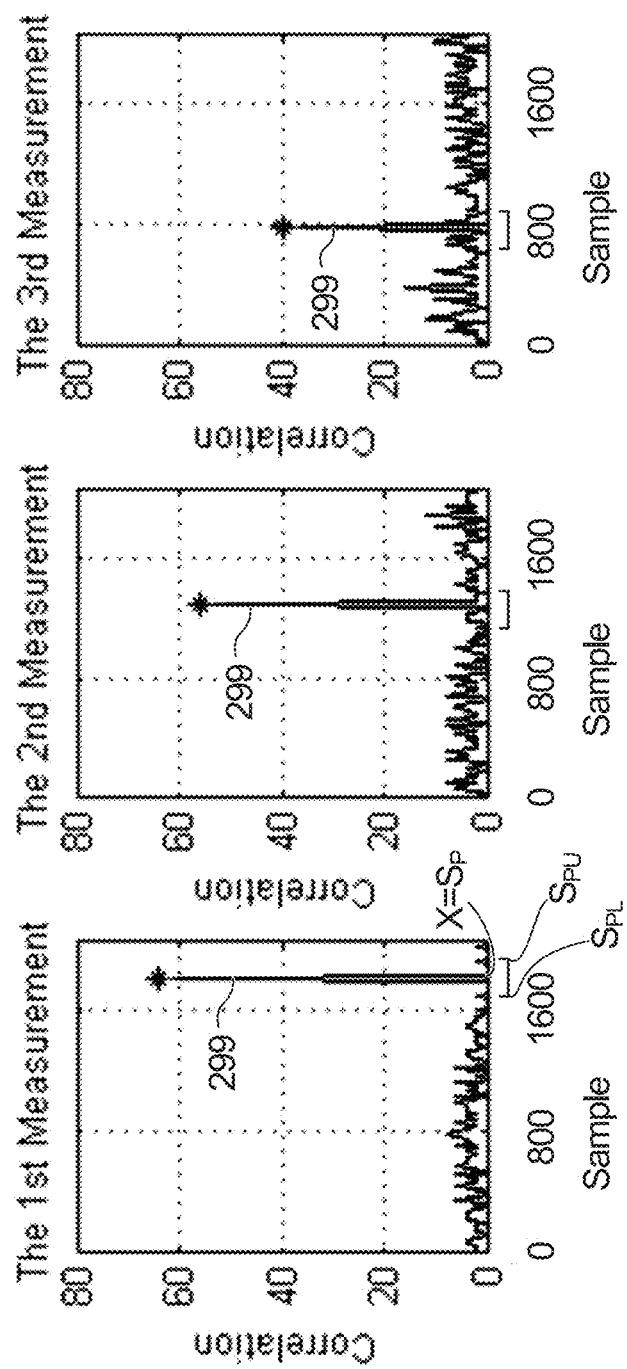
FIG. 15 shows a plot of correlation values for each of three correlation measurements in step 292B of FIG. 13.

As mentioned earlier, when performing the correlation peak tracking in step 292, all correlation values outside a small sample window around the correlation peak are ignored in step 292B. This is explained in more detail earlier with respect to FIG. 14. The small sample window may also be called a peak tracking window or a phase tracking window. In any case, as shown in FIG. 7, multiple correlation measurements for each data bit are performed in a step-wise fashion using overlapping correlation measurement windows. Therefore, the sample index of the correlation peak will move over the course of each of the correlation measurements for each bit of pilot data. This may be seen by again reviewing FIG. 9. In the first measurement the correlation peak 220 is at sample index 1800. In the second measurement, the correlation peak has moved to sample index 1300. In the third measurement, the correlation peak has moved to sample index 800, etc. Therefore, when implementing step 292B, the center X of the sample window must shift for each of the (1+F)/F correlation measurements for each bit of the received pilot data d(t). For example, FIG. 15 shows a plot of correlation values for each of three correlation measurements in step 292B. The sample window $s_{PL} \leq s \leq s_{PU}$ over which the correlation value is not ignored is moved to accommodate the expected movement of peak 299 over the different measurements.

Assuming F=0.25, such that there are 5 correlation measurements, then the sample index X around which sample range $s_{PL}$ to $s_{PU}$ is centered has the following 5 respective values:

$$X, \left(X + \frac{3N}{4}\right) \bmod N, \left(X + \frac{N}{2}\right) \bmod N, \left(X + \frac{N}{2}\right) \bmod N, \left(X + \frac{N}{4}\right) \bmod N,$$

where N is the number of samples corresponding to each codeword. In the example of FIG. 15, N=2000, $X=s_P$=1800, and only the first three correlation measurements are shown. For the first correlation measurement, the sample range is centered around $X=s_P$=1800. For the second correlation measurement, the sample range is centered around $$\left(1800 + \frac{3(2000)}{4}\right) \bmod 2000 = 1300.$$

For the third correlation measurement, the sample range is centered around $$\left(1800 + \frac{2000}{2}\right) \bmod 2000 = 800.$$

If the correlation measurement window in the correlator 174 happens to be aligned with the received data bit in pilot data d(t), then X=1 and the center of the five measurement windows are at the following five respective sample index values:

$$1, \frac{3N}{4}+1, \frac{N}{2}+1, \frac{N}{2}+1, \text{ and } \frac{N}{4}+1.$$

Because of the clock difference between the clock for generating the pilot tone and the clock for generating the down-shifting frequency in the pilot tone detector, the sample index at which the correlation peak is located may vary slowly with time. That is, the value X described above that indicates the sample index of the correlation peak may vary slowly with time over the course of several bits of the received pilot data d(t). In some embodiments, the controller 174 accommodates the varying the sample index of the correlation peak in the manner explained below.

Figure 16:
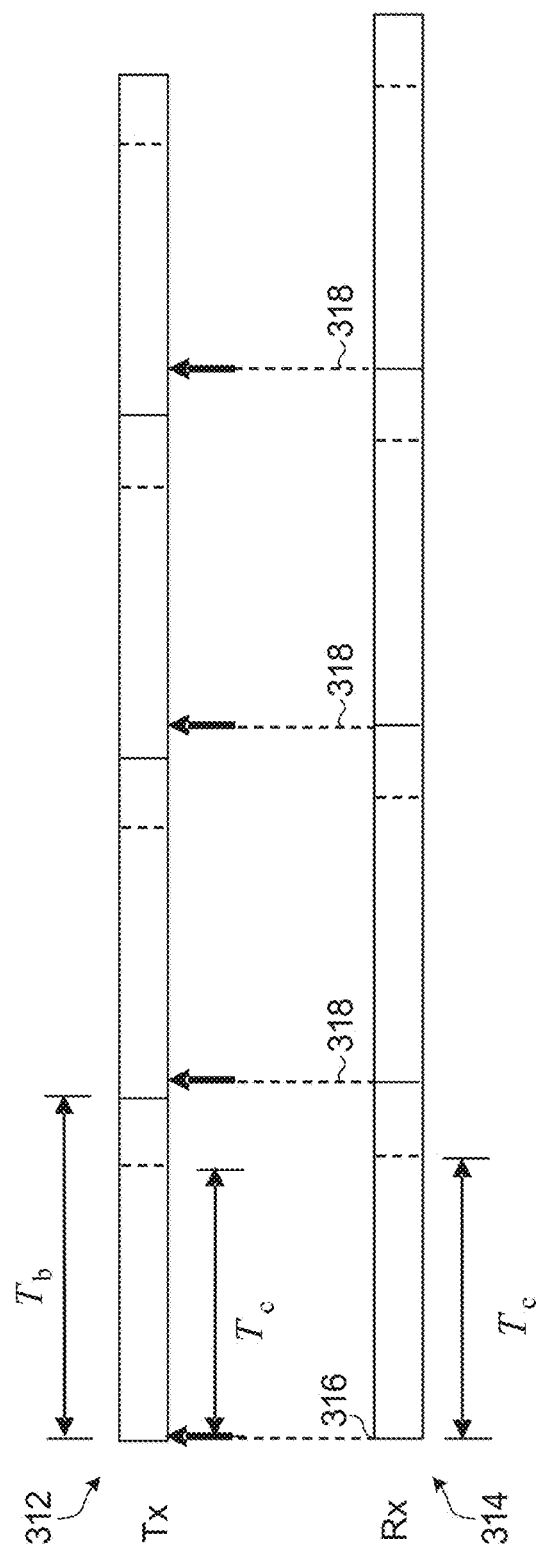
FIG. 16 illustrates a steam of four bits of pilot data transmitted from an optical transmitter and received at a pilot tone detector.

FIG. 16 illustrates a steam of four bits of pilot data d(t) transmitted from an optical transmitter and received at a pilot tone detector. The transmitted bits are indicated at 312, and the received bits are indicated at 314. The maximum correlation peak is located at sample index 1 of the first received data bit, and this is indicated at 316. Therefore, when tracking the maximum correlation peak bit-to-bit for received pilot data d(t), the peak should be around sample 1 for each received codeword. However, the location of the correlation peak varies over time due to the clock difference between the clock for generating the pilot tone in the optical transmitter and the clock for generating the down-shifting frequency in the pilot tone detector. In the duration of time illustrated in FIG. 16, the received codeword includes a greater number of samples than the average number of samples corresponding to a transmitted codeword. The location of the correlation peak therefore varies, as indicated at 318. FIG. 16 is only an example. As another example, the location of the correlation peak would also vary if the received codeword instead included a number of samples that is less than the average number of samples corresponding to a transmitted codeword.

To accommodate a correlation peak that varies over time, in one embodiment the controller 174 updates the center of the sample window on a regular, semi-regular, or occasional basis. For example, the value X discussed above may be updated on a regular basis so that the center of the sample window tracks the varying nature of the correlation peak. In one embodiment, the center of the sample window is initially set as $X=s_P$, i.e. the sample index of the maximum correlation peak output of step 282. The value X is then either incremented or decremented by a single sample index per bit of received pilot data d(t) so that center of the sample window is moved one sample per bit of received pilot data d(t). The direction of the movement (i.e. whether to increment or decrement X) is equal to the direction that would bring the center of the sample window closer to the sample index at which the maximum correlation peak is located for that bit of received pilot data d(t). In low SNR conditions, the maximum correlation peak in the sample window may vary for each bit of received pilot data d(t) due to noise. Moving the sample window center to the (possibly new)

peak position for each bit of received pilot data d(t) may therefore not be as reliable. Instead, by allowing for movement of the sample window center by maximum one sample for each bit of received pilot data d(t), the sample window center is moved in the direction of the varying location of the maximum correlation peak, but over the course of each bit of received pilot data d(t), the sample window center cannot be moved large distances based on transient noise swings that cause potentially large movements of the maximum correlation peak in the sample window. Note that movement of the sample window center by maximum one sample for each bit of received pilot data d(t) is only an example. In some embodiments, how much movement of the sample window center is allowed for each bit of received pilot data d(t) may depend upon the transmitter clock and the pilot tone detector clock difference, the codeword duration, and the number of samples per codeword bit. The amount of movement should be large enough to track the drifting of the maximum correlation peak.

The frequency $\omega_P$ of the maximum correlation peak, which was selected in step 282 of FIG. 13, may also vary slowly with time. Therefore, in some embodiments, the controller 174 may vary over time the center $\omega_P$ of the frequency range $\omega_{PL} \leq \omega \leq \omega_{PU}$ selected in step 292A. As one example, the center $\omega_P$ of the frequency range $\omega_{PL} \leq \omega \leq \omega_{PU}$ may be varied by q kHz per bit of received pilot data d(t), and the direction of the movement may be equal to the direction that would bring the center $\omega_P$ closer to the frequency within the frequency range $\omega_{PL} \leq \omega \leq \omega_{PU}$ at which the maximum correlation peak is located for that bit of received pilot data d(t).

Possible benefits of some of the embodiments described above are as follows. By shrinking the searching area (fine frequency search and smaller sample window), the effect of the noise may substantially suppressed. Therefore, the pilot tone detection sensitivity may be improved. By shrinking the searching area and limiting the window center updating, the correct sample index and frequency may be stably locked. By changing the frequency search to a combination of coarse and fine search, the number of searching steps may be significantly reduced. Therefore, the computational resources required may be significantly reduced.

Figure 17:
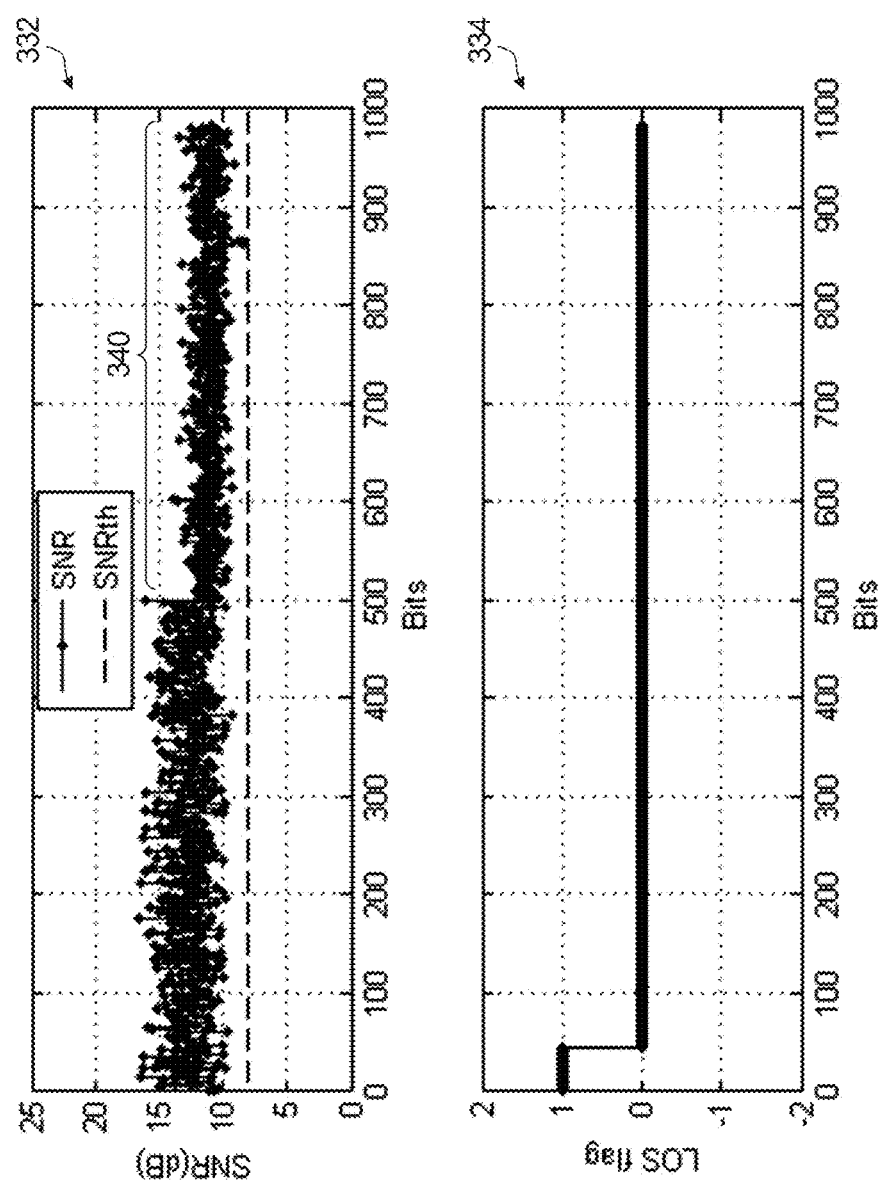
FIG. 17 illustrates a graph of computed SNR and a graph of the loss of signal (LOS) flag without correlation peak tracking.

Simulations were performed to evaluate the performance of some embodiments. FIG. 17 illustrates a graph 332 of computed SNR in a pilot tone detector over the course of 1000 pilot data bits, as well as a corresponding graph 334 showing the status of the LOS flag. The graphs of FIG. 17 correspond to the detection of one pilot tone signal, and the pilot data is composed of two parts: low SNR data (around 10 dB) for the first 500 bits of pilot data d(t), followed by no signal for the last 500 bits of pilot data d(t). SNR is measured in the correlation domain. FIG. 17 illustrates the situation in which there is no tracking of the correlation peak. Even though there is no pilot tone signal during the last 500 bits, as shown at 340 the SNR still remains above a minimum threshold $SNR_{th}$ due to a noise floor and so the LOS flag remains LOS=0. A noise peak is mistaken as the real correlation peak, and therefore the SNR is over-estimated. Without correlation peak tracking, the SNR of the first 500 bits and second 500 bits are both around 10 dB, and the loss of signal is not discriminated by a threshold. The loss of signal after the first 500 bits of pilot data d(t) cannot be detected.

Figure 18:
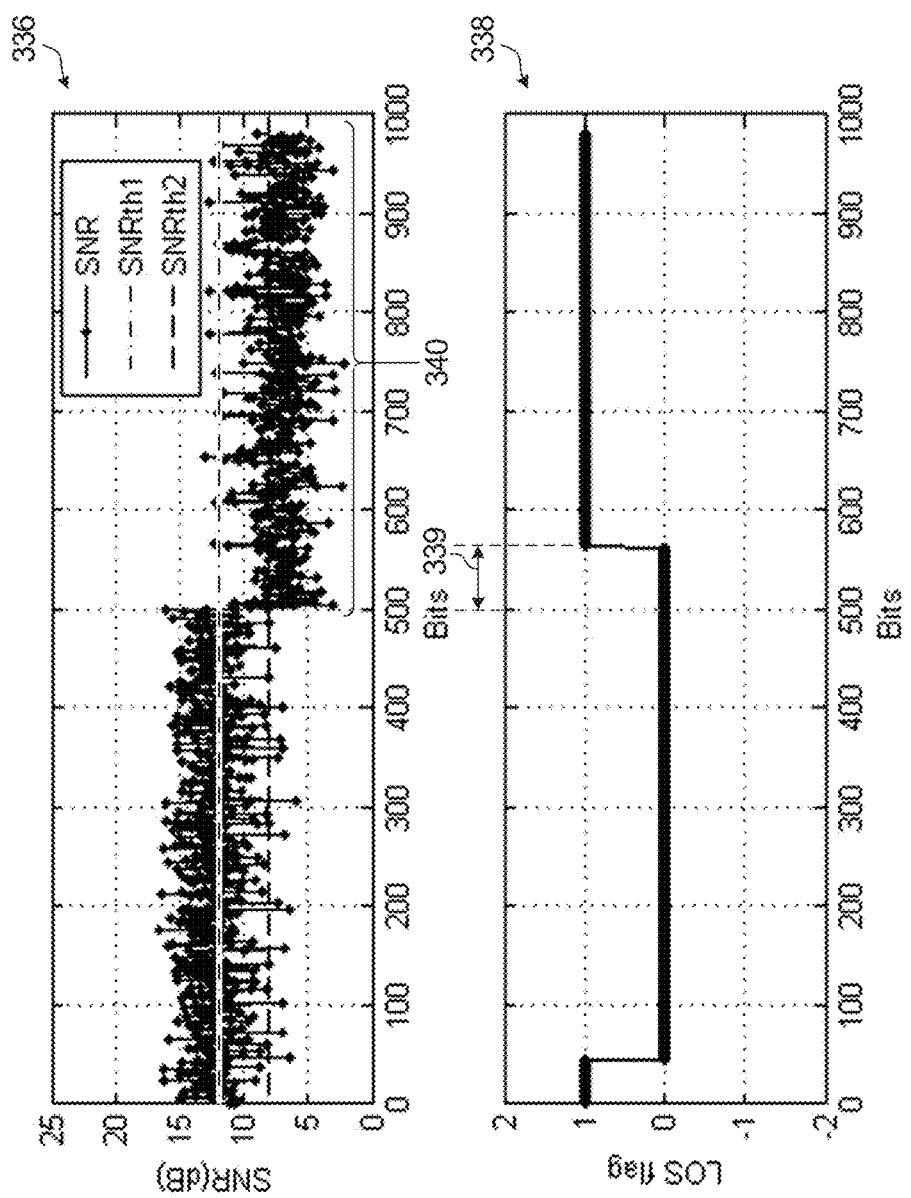
FIG. 18 illustrates a graph of computed SNR and a graph of the LOS flag with correlation peak tracking.

In contrast, FIG. 18 illustrates in graphs 336 and 338 the situation in which there is tracking of the correlation peak, e.g. as per FIG. 13 above. The signal power is computed using the maximum correlation peak power in the peak tracking sample window. Noise power is computed using the averaged power of the rest of the correlation values. In FIG. 18, LOS=1 after there is no signal beyond the first 500 bits. Note that the LOS detection has a short time delay, shown at 339, because a running average of SNR ($SNR_{ra}$) is used to determine the LOS. With correlation peak tracking, the SNR after the first 500 bits is decreased, and LOS can be detected.

Figure 19:
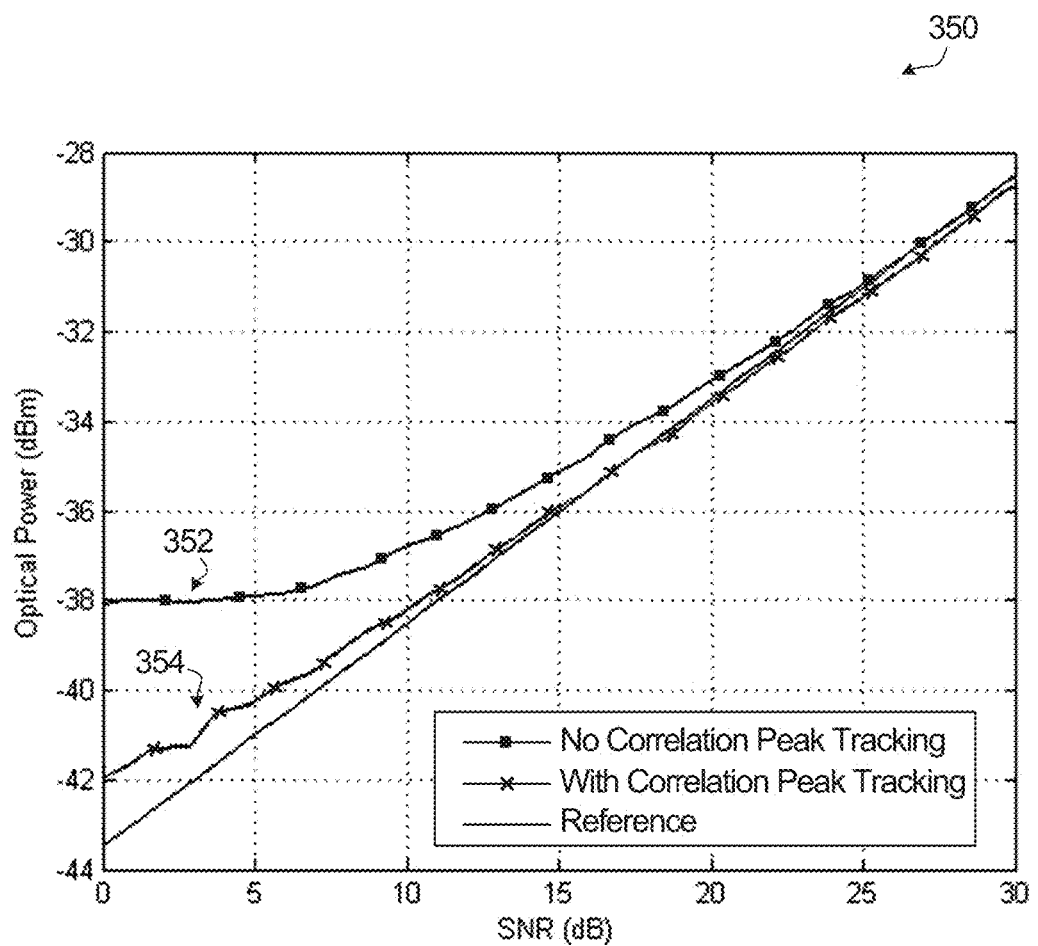
FIG. 19 illustrates a plot of optical power for different SNR.

FIG. 19 illustrates a plot 350 of optical power for different SNR. In a low SNR environment, e.g. SNR below 10 dB, there is a noise floor 352 that is mistaken for pilot signal SNR when there is no correlation peak tracking. However, when the correlation peak tracking described in FIG. 13 is performed, the computation of the SNR of the pilot signal is improved at low SNR, as shown at 354. FIG. 19 shows that with correlation peak tracking, the power detection dynamic range may be increased, the noise may be significantly suppressed in a low SNR environment, and power accuracy at low SNR may be improved compared to no correlation peak tracking.

In some of the embodiments discussed earlier, smaller numbers were used for ease of explanation. In actual implementation, and as one example, the length of each codeword ($m_0$ and $m_1$) may be 128 bits, F may be equal to 0.25, the number of samples corresponding to each received codeword bit may be eight, the number of frequency steps for both the coarse frequency range (step 282 of FIG. 13) and the fine frequency range (step 292 of FIG. 13) may be the same and equal to nine evenly spaced steps within the range, the number of samples in the smaller sample window around $s_P$ (in step 292 of FIG. 13) may be 17, and the number of pilot data bits used to compute the running SNR average (in step 292D of FIG. 13) may be a few tens (e.g. around 20 pilot data bits).

Figure 20:
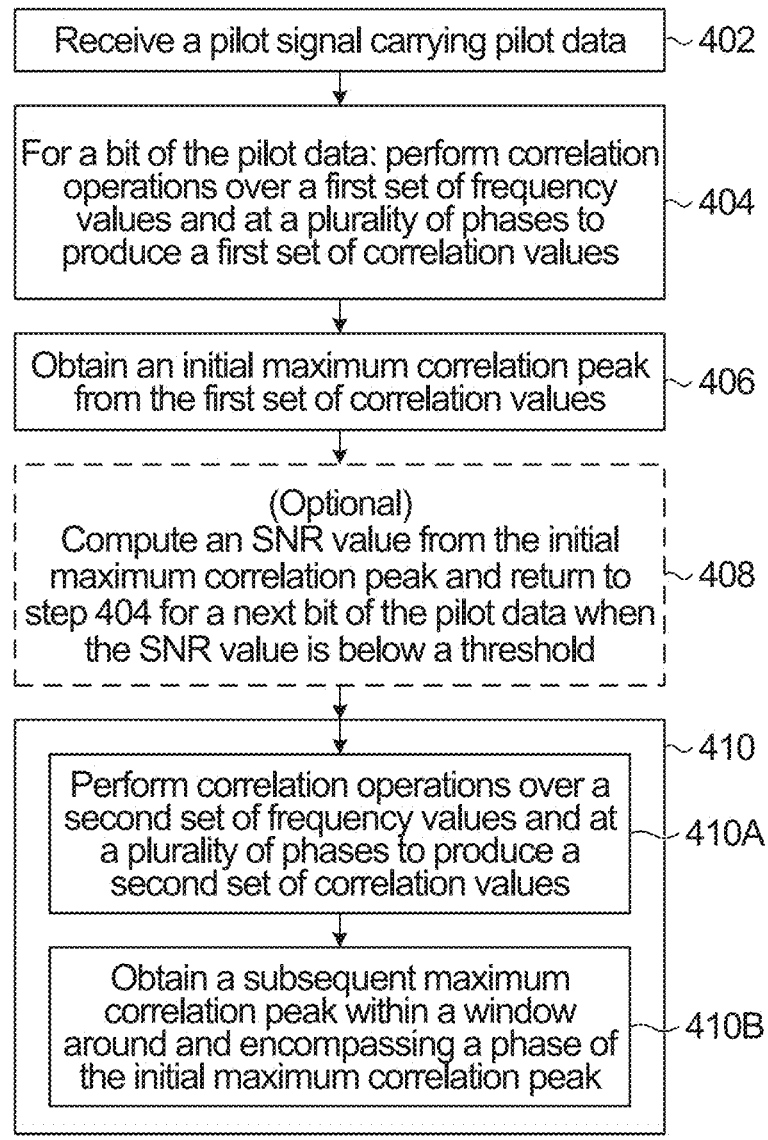
FIG. 20 is a flowchart of a method for detecting pilot data, according to one embodiment.

FIG. 20 is a flowchart of a method for detecting pilot data, according to one embodiment. The method may be performed in a pilot tone detector, e.g. pilot tone detector 106.

In step 402, a pilot signal carrying pilot data is received. In some embodiments, the pilot signal is received from an optical channel, and the optical channel may be multiplexed with other optical channels using DWDM. Each optical channel may have a respective pilot signal, as described earlier.

In step 404, for a bit of the pilot data, correlation operations are performed on the pilot signal over a first set of frequency values and at a plurality of phases. A first set of correlation values is thereby produced. In step 406, an initial maximum correlation peak is obtained from the first set of correlation values. The initial maximum correlation peak is for use in pilot data detection. An example of steps 404 and 406 is step 282 of FIG. 13, in which case the first set of frequency values are the frequency values in the full frequency scanning range, and the phases are sample locations in a codeword duration.

Optionally, in step 408, an SNR value is computed from the initial maximum correlation peak determined in step 406, and the method returns to step 404 for a next bit of the pilot data when the SNR value is below a first threshold. Steps 284 and 286 of FIG. 13 are an example of this optional step.

In step 410, the following operations (steps 410A and 410B) occur for each bit of subsequent bits of the pilot data. In step 410A, correlation operations are performed on the pilot signal over a second set of frequency values and at a plurality of phases to produce a second set of correlation values. Then, in step 410B, a subsequent maximum correlation peak is obtained from the second correlation values.

The subsequent maximum correlation peak is selected from correlation values, in the second set of correlation values, that were produced for phases, within a window around and encompassing a phase of the initial maximum correlation peak. The subsequent maximum correlation peak is for use in pilot data detection.

Optionally, step 410 further includes computing a plurality of subsequent SNR values, each corresponding to a respective bit of the subsequent bits of the pilot data. Each subsequent SNR value is computed based on the subsequent maximum correlation peak for the respective bit. An average SNR value is then obtained from the plurality of subsequent SNR values. The method then returns to step 404 for a next bit of the pilot data when the average SNR value is below a second threshold. Steps 292 and 294 of FIG. 13 are an example of this optional subject matter. The average SNR value may be a running SNR average.

In some embodiments, the magnitude of the first threshold may be greater than the magnitude of the second threshold.

In some embodiments, the method of FIG. 20 further includes indicating a LOS when the SNR value is below the first threshold and/or when the SNR average is below the second threshold.

In some embodiments, the first set of frequency values are within a first frequency range, the second set of frequency values are within a second frequency range, and the second frequency range is smaller than the first frequency range. For example, the first frequency range may be the full frequency range, and the second frequency range may be a frequency range smaller than the full frequency range. The initial maximum correlation peak occurs at a particular frequency within the first frequency range, and the second frequency range may be around and encompass the particular frequency. In some embodiments, a frequency spacing between adjacent frequency values in the second frequency range is smaller than a frequency spacing between adjacent frequency values in the first frequency range. For example, the first frequency range may be a coarse frequency range and the second frequency range may be a fine frequency range, as discussed earlier.

In some embodiments, the pilot signal carries a plurality of codewords, and each codeword represents a bit of the pilot data. An example is codewords $m_0$ and $m_1$ discussed earlier. The phase of the initial maximum correlation peak is then a particular sample location within a codeword duration. The window around and encompassing the phase of the initial maximum correlation peak is therefore around and encompassing the particular sample location.

In some embodiments, performing correlation operations in step 404 may include computing the first set of correlation values by, for each frequency value of the first set of frequency values: downshifting the pilot signal based on the frequency value to obtain a downshifted signal, and then correlating the downshifted signal with each possible transmitted codeword at a plurality of sample locations to obtain correlation values of the first set of correlation values. The initial maximum correlation peak may then be selected as the correlation value of maximum magnitude in the first set of correlation values.

In some embodiments, performing the correlation operations in step 410 may include computing the second set of correlation values by, for each frequency value of the second set of frequency values: downshifting the pilot signal based on the frequency value to obtain a downshifted signal, and then correlating the downshifted signal with each possible transmitted codeword at a plurality of sample locations to obtain correlation values of the second set of correlation values. The second maximum correlation value may then be selected as the correlation value of maximum magnitude from correlation values, of the second set of correlation values, that are at sample locations within the window.

In some embodiments, the method of FIG. 20 may further include shifting the window to correspond to a change in the particular sample location when computing the second correlation values. An example of this is described above in relation to FIG. 15.

In some embodiments, the center of the window may be moved over time in a direction that causes the center of the window to be closer to a sample location of the second maximum correlation value. In some such implementations, the center of the window may be moved by no more than one sample location for each bit of the pilot data. An example is described above in relation to FIG. 16.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

What is claimed is:

1. A method for detecting pilot data comprising:
receiving an optical signal from an optical channel, the optical signal comprising a pilot signal, the pilot signal carrying the pilot data;
detecting, by an optical-to-electrical converter, the pilot signal in the optical signal; and
performing operations on the pilot signal including:
(i) for a bit of the pilot data: performing correlation operations on the pilot signal over a first set of frequency values and at a plurality of phases to produce a first set of correlation values, and obtaining from the first set of correlation values an initial maximum correlation peak for use in pilot data detection; and
(ii) for each bit of subsequent bits of the pilot data: performing correlation operations on the pilot signal over a second set of frequency values and at a plurality of phases to produce a second set of correlation values, and obtaining a subsequent maximum correlation peak from the second set of correlation values for use in the pilot data detection, wherein the subsequent maximum correlation peak is selected from correlation values, in the second set of correlation values, that were produced for phases within a window around and encompassing a phase of the initial maximum correlation peak.

2. The method of claim 1 further comprising:
prior to (ii), computing a signal-to-noise (SNR) value from the initial maximum correlation peak, and returning to (i) for a next bit of the pilot data in response to the SNR value being below a first threshold.

3. The method of claim 2, wherein (ii) further comprises:
computing a plurality of subsequent SNR values, each corresponding to a respective bit of the subsequent bits of the pilot data, and each subsequent SNR value computed based on the subsequent maximum correlation peak for the respective bit;
obtaining an SNR average from the plurality of subsequent SNR values; and
returning to (i) for a next bit of the pilot data in response to the SNR average being below a second threshold.

4. The method of claim 3, wherein a magnitude of the first threshold is greater than a magnitude of the second threshold.

5. The method of claim 3, further comprising indicating a loss of signal (LOS) in response to at least one of: the SNR value being below the first threshold, or the SNR average being below the second threshold.

6. The method of claim 1, wherein:
the first set of frequency values are within a first frequency range, the second set of frequency values are within a second frequency range, and the second frequency range is smaller than the first frequency range; and
the initial maximum correlation peak occurs at a particular frequency within the first frequency range, and the second frequency range is around and encompasses the particular frequency.

7. The method of claim 6, wherein a frequency spacing between adjacent frequency values in the second frequency range is smaller than a frequency spacing between adjacent frequency values in the first frequency range.

8. The method of claim 1, wherein:
the pilot signal carries a plurality of codewords, each codeword representing a bit of the pilot data;
the phase of the initial maximum correlation peak is a particular sample location within a codeword duration, and the window around and encompassing the phase of the initial maximum correlation peak is around and encompassing the particular sample location;
performing the correlation operations in (i) comprises:
computing the first set of correlation values by, for each frequency value of the first set of frequency values: downshifting the pilot signal based on the frequency value to obtain a downshifted signal, and correlating the downshifted signal with each possible transmitted codeword at a plurality of sample locations to obtain correlation values of the first set of correlation values; and
selecting, as the initial maximum correlation peak, a correlation value of maximum magnitude in the first set of correlation values;
and performing the correlation operations in (ii) comprises:
computing the second set of correlation values by, for each frequency value of the second set of frequency values: downshifting the pilot signal based on the frequency value to obtain a downshifted signal, and correlating the downshifted signal with each possible transmitted codeword at a plurality of sample locations to obtain correlation values of the second set of correlation values; and
selecting, as a second maximum correlation value, a correlation value of maximum magnitude from correlation values, of the second set of correlation values, that are at sample locations within the window.

9. The method of claim 8, further comprising: shifting the window to correspond to a change in the particular sample location when computing the second set of correlation values.

10. The method of claim 8, further comprising moving a center of the window over time in a direction that causes the center of the window to be closer to a sample location of the second maximum correlation value.

11. The method of claim 10, wherein the center of the window is moved by no more than one sample location for each bit of the pilot data.

12. A pilot tone detector comprising an optical-to-electrical converter and a digital signal processor, the pilot tone detector configured to receive an optical signal from an optical channel, the optical signal comprising a pilot signal carrying pilot data, wherein the optical-to-electrical converter is configured to detect the pilot signal in the optical signal, and wherein the digital signal processor is configured to receive the pilot data from the detected pilot signal by performing operations including:
(i) for a bit of the received pilot data: performing correlation operations on the detected pilot signal over a first set of frequency values and at a plurality of phases to produce a first set of correlation values, and obtaining from the first set of correlation values an initial maximum correlation peak for use in pilot data detection; and
(ii) for each bit of subsequent bits of the received pilot data: performing correlation operations on the detected pilot signal over a second set of frequency values and at a plurality of phases to produce a second set of correlation values, and obtaining a subsequent maximum correlation peak from the second set of correlation values for use in the pilot data detection, wherein the subsequent maximum correlation peak is selected from correlation values, in the second set of correlation values, that were produced for phases within a window around and encompassing a phase of the initial maximum correlation peak.

13. The pilot tone detector of claim 12, wherein the digital signal processor is further configured to perform operations including:
   prior to (ii), computing a signal-to-noise (SNR) value from the initial maximum correlation peak, and returning to (i) for a next bit of the received pilot data in response to the SNR value being below a first threshold.

14. The pilot tone detector of claim 13, wherein performing (ii) further comprises:
   computing a plurality of subsequent SNR values, each corresponding to a respective bit of the subsequent bits of the received pilot data, and each subsequent SNR value computed based on the subsequent maximum correlation peak for the respective bit;
   obtaining an SNR average from the plurality of subsequent SNR values; and
   returning to (i) for a next bit of the received pilot data in response to the SNR average being below a second threshold.

15. The pilot tone detector of claim 14, wherein a magnitude of the first threshold is greater than a magnitude of the second threshold.

16. The pilot tone detector of claim 14, wherein the digital signal processor is further configured to perform operations including indicating a loss of signal (LOS) in response to at least one of: the SNR value being below the first threshold, or the SNR average being below the second threshold.

17. The pilot tone detector of claim 12, wherein:
   the first set of frequency values are within a first frequency range, the second set of frequency values are within a second frequency range, and the second frequency range is smaller than the first frequency range; and
   the initial maximum correlation peak occurs at a particular frequency within the first frequency range, and the second frequency range is around and encompasses the particular frequency.

18. The pilot tone detector of claim 17, wherein a frequency spacing between adjacent frequency values in the second frequency range is smaller than a frequency spacing between adjacent frequency values in the first frequency range.

19. The pilot tone detector of claim 12, wherein:
   the detected pilot signal carries a plurality of codewords, each codeword representing a bit of the received pilot data;
   the phase of the initial maximum correlation peak is a particular sample location within a codeword duration, and the window around and encompassing the phase of the initial maximum correlation peak is around and encompassing the particular sample location;
   performing the correlation operations in (i) comprises:
   computing the first set of correlation values by, for each frequency value of the first set of frequency values: downshifting the detected pilot signal based on the frequency value to obtain a downshifted signal, and correlating the downshifted signal with each possible transmitted codeword at a plurality of sample locations to obtain correlation values of the first set of correlation values; and
   selecting, as the initial maximum correlation peak, a correlation value of maximum magnitude in the first set of correlation values;
   and performing the correlation operations in (ii) comprises:
   computing the second set of correlation values by, for each frequency value of the second set of frequency values: downshifting the detected pilot signal based on the frequency value to obtain a downshifted signal, and correlating the downshifted signal with each possible transmitted codeword at a plurality of sample locations to obtain correlation values of the second set of correlation values; and
   selecting, as a second maximum correlation value, a correlation value of maximum magnitude from correlation values, of the second set of correlation values, that are at sample locations within the window.

20. The pilot tone detector of claim 19, wherein the digital signal processor is further configured to perform operations including: shifting the window to correspond to a change in the particular sample location when computing the second set of correlation values.

21. The pilot tone detector of claim 19, wherein the digital signal processor is further configured to perform operations including: moving a center of the window over time in a direction that causes the center of the window to be closer to a sample location of the second maximum correlation value.

22. The pilot tone detector of claim 21, wherein the center of the window is moved by no more than one sample location for each bit of the received pilot data.

* * * * *